(12) United States Patent
Zhang et al.

(10) Patent No.: US 9,135,489 B2
(45) Date of Patent: Sep. 15, 2015

(54) SYSTEM FOR DECODING TWO DIMENSIONAL CODE AND METHOD THEREOF

(71) Applicants: PEKING UNIVERSITY FOUNDER GROUP CO., LTD., Beijing (CN); FOUNDER MOBILE MEDIA TECHNOLOGY (BEIJING) CO., LTD., Beijing (CN)

(72) Inventors: Ling Zhang, Beijing (CN); Chao Guan, Beijing (CN); Zhenhua Liu, Beijing (CN); Gezhang Liu, Beijing (CN); Wanyi Che, Beijing (CN)

(73) Assignees: PEKING UNIVERSITY FOUNDER GROUP CO., LTD., Beijing (CN); FOUNDER MOBILE MEDIA TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 14/103,881

(22) Filed: Dec. 12, 2013

(65) Prior Publication Data
US 2015/0090792 A1 Apr. 2, 2015

(30) Foreign Application Priority Data
Sep. 29, 2013 (CN) .......................... 2013 1 0454907

(51) Int. Cl.
*G06K 7/00* (2006.01)
*G06K 7/10* (2006.01)
*G06K 7/14* (2006.01)

(52) U.S. Cl.
CPC ............ *G06K 7/1417* (2013.01); *G06K 7/1478* (2013.01)

(58) Field of Classification Search
USPC ................ 235/462.01, 462.04, 462.08–462.1
See application file for complete search history.

(56) References Cited

U.S. PATENT DOCUMENTS

| | | | | |
|---|---|---|---|---|
| 6,081,627 A | * | 6/2000 | Kannon et al. | 382/312 |
| 6,317,223 B1 | * | 11/2001 | Rudak et al. | 382/275 |
| 7,997,502 B2 | * | 8/2011 | Lv et al. | 235/494 |
| 2004/0020989 A1 | * | 2/2004 | Muramatsu | 235/462.1 |
| 2005/0121520 A1 | * | 6/2005 | Yamaguchi et al. | 235/462.09 |
| 2006/0091215 A1 | * | 5/2006 | Uchiyama | 235/462.1 |
| 2007/0145139 A1 | * | 6/2007 | Ayatsuka | 235/462.1 |
| 2011/0290878 A1 | * | 12/2011 | Sun et al. | 235/437 |
| 2013/0140354 A1 | * | 6/2013 | Fan et al. | 235/375 |

* cited by examiner

*Primary Examiner* — Tuyen K Vo
(74) *Attorney, Agent, or Firm* — Brinks Gilson & Lione

(57) ABSTRACT

Method and system for decoding a two dimensional code is disclosed. In the binarization process of a two dimensional code image, through performing a dividing operation on the two dimensional code image, each block region has a different grayscale threshold. For each block region, whether a pixel in the block region is determined as black or white is not solely based on the grayscale value of the pixel itself, but also an average grayscale value of a predetermined area set for the block region where the pixel locates. When the predetermined area in which the block region locates has a larger grayscale value as a whole, the grayscale threshold corresponding to the block region may become larger, and vice versa.

31 Claims, 8 Drawing Sheets

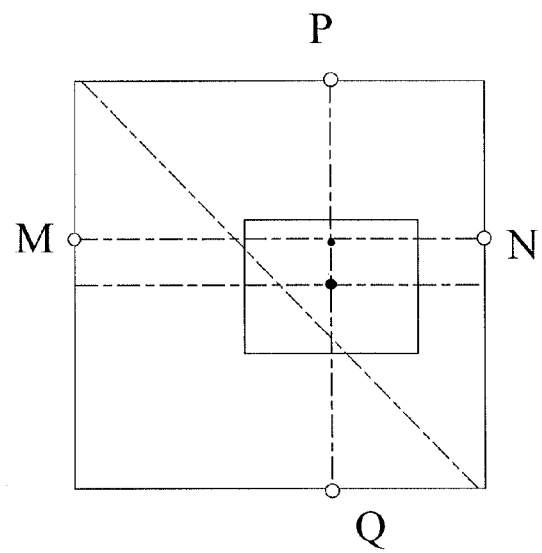
Fig. 8
Initial coordinate system
Correction coordinate system
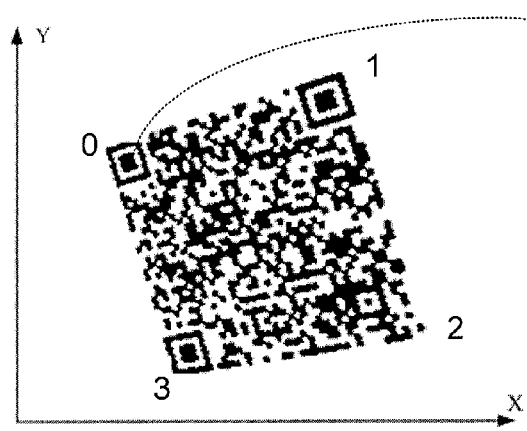
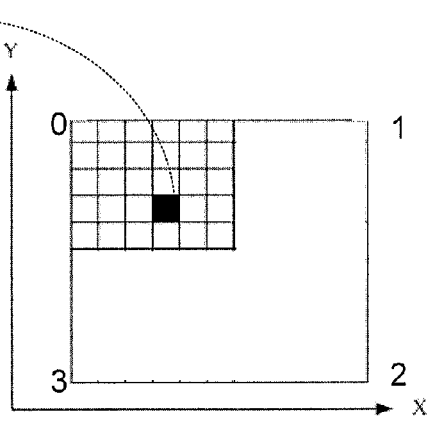
Fig. 9　　　　　　　　　　Fig. 10

SYSTEM FOR DECODING TWO DIMENSIONAL CODE AND METHOD THEREOF

CROSS-REFERENCE TO RELATED APPLICATIONS

This application claims priority to Chinese Patent Application No. 201310454907.0, filed on Sep. 29, 2013 and entitled "SYSTEM FOR DECODING TWO DIMENSIONAL CODE AND METHOD THEREOF", which is incorporated herein by reference in its entirety.

FIELD OF THE INVENTION

The present invention relates to the field of two dimensional code techniques, and more particular, to a system for decoding a two dimensional code and the method thereof.

DESCRIPTION OF THE RELATED ART

An algorithm for decoding an image processing based two dimensional code may be generally divided into five steps: image pre-processing, locating and correction, data reading, error correction and decoding. Basic steps of image pre-processing comprise grayscale conversion, image filtering, threshold segmentation, edge detection. Binarization may take place in the threshold segmentation step. The obtained grayscale image is enhanced according to some enhancement algorithms, such as contract adaption and brightness adjustment, and then targets are segmented from the background using a binarization algorithm, to convert a picture into a monochrome (black-and-white) image for decoding.

However, due to different mediums on which two dimensional codes may be attached, different illumination environments, and different imaging systems, two dimensional code images may be captured by two dimensional code readers in a wide variety of quality. Noises, non-uniform illumination, too high/low contrasts may complicate the conversion from the two dimensional code image to the binary image, and the effect of image binarization may have a direct impact on two dimensional code reading and recognition. Binarization methods in the prior art have some deficiencies in coping with complex backgrounds, which is unable to deal with dark images, non-uniform illumination, or too high/low contrasts, and thus cannot lead to satisfied binarization effects. Binary images obtained in poor quality may make a later decoding process more difficult, leading to a larger amount of computation, or lower decoding accuracy, or even unsuccessful decoding. With the progress of techniques, existing decoding techniques are unable to meet higher and higher requirements of users in terms of the speed and accuracy of decoding two dimensional code.

SUMMARY OF THE INVENTION

Thus, this invention provides a system and method for decoding a two dimensional code to address the above technical problems in the prior art.

In order to solve the above problems, this invention is implemented in the following technical solutions.

A method for decoding two dimensional code, comprising the following steps:

performing a binarization process on a two dimensional code image to obtain a binary image, the binarization process comprising:

dividing the two dimensional code image into a plurality of block regions;

obtaining grayscale values of all pixels in each block region, and obtaining a grayscale value for each block region according to the grayscale values of all the pixels;

determining, a grayscale threshold for each block region according to an average grayscale value of a predetermined area where the block region locates;

binarizing pixels in the block region to obtain a binary image, according to a grayscale threshold corresponding to each block region;

decoding the binary image to obtain information content contained in the two dimensional code.

In the method for decoding two dimensional code, the binarization process further comprises the following steps:

constructing a contrast factor according to the relationship between grayscale values of pixels in the two dimensional code image, wherein the contrast factor is proportional to the difference between a maximum grayscale value and a minimum grayscale value of the two dimensional code image;

the step of obtaining grayscale values of all pixels in each block region, and obtaining a grayscale value for each block region according to the grayscale values of all the pixels comprises:

determining a grayscale value for a block region, according to the relationship between the contrast factor and the difference between a maximum grayscale value and a minimum grayscale value in the block region, in conjunction with grayscale values of other block regions adjacent to the block region.

In the method for decoding two dimensional code, in the step of determining a grayscale value for a block region according to the relationship between the contrast factor and the difference between a maximum grayscale value and a minimum grayscale value in the block region, in conjunction with grayscale values of other block regions adjacent to the block region, a grayscale value $\overline{y_{ij}}$ is obtained for a block region (i,j) according to the following equation:

$$\overline{y_{ij}} = \begin{cases} \dfrac{S_{ij}}{m^2} & \max_{ij} - \min_{ij} > C \\ bg & \max_{ij} - \min_{ij} <= C \,\&\&\, \min_{ij} < \left(bg = \dfrac{\overline{y_{i-1j-1}} + \overline{y_{ij-1}} * 2 + \overline{y_{i-1j}}}{4}\right) \\ \dfrac{\min_{ij}}{2} & \max_{ij} - \min_{ij} <= C \,\&\&\, \min_{ij} >= \left(bg = \dfrac{\overline{y_{i-1j-1}} + \overline{y_{ij-1}} * 2 + \overline{y_{i-1j}}}{4}\right) \end{cases}$$

wherein, i represents the number of a row the block region locates, j represents the number of a column the block region locates, $S_{ij}$ represents the sum of grayscale values of all pixels in the block region, C represents the contrast factor, $\max_{ij}$ represents the maximum grayscale value in the block region, $\min_{ij}$ represents the minimum grayscale value in the block region, m represents that the block region includes m×m pixels, wherein m is an integer larger than 1.

In the method for decoding two dimensional code, the contrast factor C is constructed according to the following equation:

$$C = \begin{cases} C_0 & Y_{max} - Y_{min} < Y_0 \\ C_1 & Y_0 < Y_{max} - Y_{min} < Y_1 \\ C_2 & Y_{max} - Y_{min} > Y_1 \end{cases}$$

wherein, $C_0$, $C_1$ and $C_2$ are all constants ranging from 0 to 255, $Y_0$ and $Y_1$ are constants of brightness difference, which are both constants ranging from 0 to 255.

In the method for decoding two dimensional code, in the step of determining, a grayscale threshold for each block region according to an average grayscale value of a predetermined area where the block region locates:

the predetermined area comprises n×n block regions, wherein n is an integer larger than 1.

In the method for decoding two dimensional code, the step of decoding the binary image to obtain information content contained in the two dimensional code comprises:

determining an initial coordination system and a correction coordination system in which a corrected image locates, wherein each point in the correction coordination system corresponds to a point in the initial coordination system; and determining coordinates of central points of detection patterns and a corrected pattern in the initial coordinate system and the correction coordinate system respectively, wherein the detection patterns comprise a first detection pattern, a second detection pattern, and a third detection pattern;

correcting the binary image according to the coordinates of the central points of each detection pattern and the correction pattern in the initial coordinate system and the correction coordinate system to obtain a corrected pattern;

obtaining information contained in the corrected pattern.

In the method for decoding two dimensional code, in the step of determining coordinates of central points of the detection patterns, the step of determining a central point of each detection pattern comprises:

detecting the binary image along a first direction to detect a first line segment having a length ratio of black:white:black:white:black meeting a first predetermined ratio, and determining the central point of the first line segment;

detecting along a second direction a line running through the central point of the first line segment to get a second line segment having a length ratio of black:white:black:white:black meeting the first predetermined ratio, and using the central point of the second line segment as the central point of the detection pattern.

In the method for decoding two dimensional code, the step of determining coordinates of the central point of each detection pattern further comprises:

setting a detection step size for detecting the binary image along the first direction, wherein the detection step size is less than or equal to the number of pixels in one module of the binary image in the first direction.

In the method for decoding two dimensional code, in the step of setting a detection step size for detecting the binary image along the first direction, the detection step size is obtained according to the number of pixels in the binary image in the first direction and the number of pixels in the one module in the first direction.

In the method for decoding two dimensional code, in the step of setting a detection step size for detecting the binary image along the first direction, the detection step size is obtained through the following equation:

$$L = \text{Max}(M \times N/\text{Mod}, \text{Min})$$

wherein, M is the number of pixels contained in the binary image in the first direction, N is an adjustment coefficient and $0 < N \leq 1$, Mod is the preset number of modules contained in the binary image in the first direction, Min is the number of pixels contained in one module of the binary image in the first direction.

In the method for decoding two dimensional code, the step of determining coordinates of the central point of the correction pattern in the initial coordinate system comprises:

obtaining reference coordinates based on the relative location relationship between the central point of the correction pattern and the central points of the detection patterns;

locating the correction pattern precisely in a predetermined area with respect to the reference coordinates to obtain coordinates of the central point of the correction pattern.

In the method for decoding two dimensional code, the step of obtaining reference coordinates based on the relative location relationship between the central point of the correction pattern and the central points of the detection pattern comprises:

obtaining a horizontal reference coordinate according to the horizontal distance between the central point of the correction pattern and the central point of the first detection pattern; obtaining a vertical reference coordinate according to the vertical distance between the central point of the correction pattern and the central point of the first detection pattern, wherein the horizontal distance and the vertical distance are determined according to the following equations:

the horizontal distance is $\epsilon_h = \epsilon(X_R - X_A)$ the vertical distance is $\epsilon_z = \epsilon(Y_R - Y_A)$ wherein, $X_R = X_B - X_A + X_C$, $Y_R = Y_B - Y_A + Y_C$, $(X_B, Y_B)$ is the coordinates of the central point of the second detection pattern; $(X_C, Y_C)$ is the coordinates of the central point of the third detection pattern; $\epsilon$ is an offset factor of the correction pattern, and $\epsilon = (N-3)/K$, K is the number of modules contained in the binary image in the first direction.

In the method for decoding two dimensional code, in the step of locating the correction pattern precisely in a predetermined area with respect to the reference coordinates to obtain coordinates of the central point of the correction pattern:

the predetermined area is a square region including the reference coordinates, wherein the square region includes at least 64 modules.

In the method for decoding two dimensional code, the step of locating the correction pattern precisely in a predetermined area with respect to the reference coordinates to obtain coordinates of the central point of the correction pattern comprises:

detecting, in the predetermined area along the first direction, a third line segment having a length ratio of white:black:white meeting a second predetermined ratio, and determining the central point of the black portion of the third line segment;

taking the central point of the black portion of the third line segment as a reference to obtain a line perpendicular to the third line segment, detecting along the line a fourth line segment having a length ration of white:black:white meeting the second predetermined ratio, and taking the central point of the black portion of the fourth line segment as the central point of the correction pattern.

In the method for decoding two dimensional code, the step of correcting the binary image according to the coordinates of the central point of each detection pattern and the correction pattern in the initial coordinate system and the correction coordinate system to obtain a corrected pattern comprises:

obtaining conversion coefficients according to coordinates of the central point of each detection pattern and coordinates of the central point of the correction pattern in the initial coordinate system and the correction coordinate system;

according to the conversion coefficients, for each point in the correction coordinate system, finding out a module of the binary image in which its corresponding point in the initial coordinate system locates, and assigning the grayscale value of that module to the point to realize correction of the binary image.

In the method for decoding two dimensional code, in the step of according to the conversion coefficients, for each point in the correction coordinate system, finding out a module of the binary image in which its corresponding point in the initial coordinate system locates, and assigning the grayscale value of that module to the point to realize correction of the binary image, the grayscale value of the module is the grayscale value of the central pixel of the module.

In the method for decoding two dimensional code, in the process of obtaining conversion coefficients according to coordinates of the central point of each detection pattern and coordinates of the central point of the correction pattern in the initial coordinate system and the correction coordinate system, the conversion coefficients are obtained following a rule of perspective transformation.

A system for decoding two dimensional code is further provided in this invention, comprising:

a binarization module for performing a binarization process on a two dimensional code image to obtain a binary image, further comprising:

a dividing unit for dividing the two dimensional code image into a plurality of block regions;

a grayscale value obtaining unit for obtaining grayscale values of all pixels in each block region, and obtaining a grayscale value for each block region according to the grayscale values of all the pixels;

a grayscale threshold obtaining unit for determining, a grayscale threshold for each block region according to an average grayscale value of a predetermined area where the block region locates;

a binary image obtaining unit for binarizing pixels in the block region to obtain a binary image, according to a grayscale threshold corresponding to each block region;

a decoding module for decoding the binary image to obtain information content contained in the two dimensional code.

In the system for decoding two dimensional code, the binarization module further comprises:

a contrast factor construction module for constructing a contrast factor according to the relationship between grayscale values of pixels in the two dimensional code image, wherein the contrast factor is proportional to the difference between a maximum grayscale value and a minimum grayscale value of the two dimensional code image;

wherein the grayscale value obtaining unit is further configured to determine a grayscale value for a block region, according to the relationship between the contrast factor and the difference between a maximum grayscale value and a minimum grayscale value in the block region, in conjunction with grayscale values of other block regions adjacent to the block region.

In the system for decoding two dimensional code, the contrast factor construction module obtains a grayscale value $\overline{y}_{ij}$ for a block region (i,j) in according to the following equation:

$$\overline{y}_{ij} = \begin{cases} \dfrac{S_{ij}}{m^2} & \max_{ij} - \min_{ij} > C \\ bg & \max_{ij} - \min_{ij} <= C \ \&\& \ \min_{ij} < \left(bg = \dfrac{\overline{y}_{i-1j-1} + \overline{y}_{ij-1} * 2 + \overline{y}_{i-1j}}{4}\right) \\ \dfrac{\min_{ij}}{2} & \max_{ij} - \min_{ij} <= C \ \&\& \ \min_{ij} >= \left(bg = \dfrac{\overline{y}_{i-1j-1} + \overline{y}_{ij-1} * 2 + \overline{y}_{i-1j}}{4}\right) \end{cases}$$

wherein, i represents the number of a row the block region locates, j represents the number of a column the block region locates, $S_{ij}$ represents the sum of grayscale values of all pixels in the block region, C represents the contrast factor, $\max_{ij}$ represents the maximum grayscale value in the block region, $\min_{ij}$ represents the minimum grayscale value in the block region, m represents that the block region includes m×m pixels, wherein m is an integer larger than 1.

In the system for decoding two dimensional code, the contrast factor C is constructed in the contrast factor construction module according to the following equation:

$$C = \begin{cases} C_0 & Y_{max} - Y_{min} < Y_0 \\ C_1 & Y_0 < Y_{max} - Y_{min} < Y_1 \\ C_2 & Y_{max} - Y_{min} > Y_1 \end{cases}$$

wherein, $C_0$, $C_1$ and $C_2$ are all constants ranging from 0 to 255, $Y_0$ and $Y_1$ are constants of brightness difference, which are both constants ranging from 0 to 255.

In the system for decoding two dimensional code, in the grayscale threshold obtaining unit, the predetermined area is set to comprise n×n block regions, wherein the n is an integer larger than 1.

In the system for decoding two dimensional code, the decoding module comprises:

a coordinate determination unit, for determining an initial coordination system and a correction coordination system in which a corrected image locates, wherein each point in the correction coordination system corresponds to a point in the initial coordination system; and comprising:

a detection pattern coordinate obtaining subunit for determining coordinates of central points of detection patterns in the initial coordinate system, a correction pattern coordinate obtaining subunit for determining coordinates of the central points of the correction pattern in the initial coordinate system;

a correction coordinates obtaining subunit for determining the coordinates of the central points of the detection patterns and the correction patterns in the correction coordinate system;

a correction pattern obtaining unit for correcting the binary image according to the coordinates of the central points of each detection pattern and the correction pattern in the initial coordinate system and the correction coordinate system to obtain a corrected pattern;

an information obtaining unit for obtaining information contained in the corrected pattern.

In the system for decoding two dimensional code, the detection pattern coordinate obtaining subunit is configured to detect the binary image along a first direction to detect a first line segment having a length ratio of black:white:black:white:black meeting a first predetermined ratio, and determining the central point of the first line segment; and detect along a second direction a line running through the central point of the first line segment to get a second line segment having a length ratio of black:white:black:white:black meeting the first predetermined ratio, and using the central point of the second line segment as the central point of the detection pattern.

In the system for decoding two dimensional code, the detection pattern coordinate obtaining subunit is further configured to set a detection step size for detecting the binary image along the first direction, wherein the detection step size is less than or equal to the number of pixels in one module of the binary image in the first direction.

In the system for decoding two dimensional code, the detection pattern coordinate obtaining subunit is further configured to obtain the detection step size according to the number of pixels in the binary image in the first direction and the number of pixels in the one module in the first direction.

In the system for decoding two dimensional code, the detection pattern coordinate obtaining subunit obtains the detection step through the following equation:

$$L=\text{Max}(M \times N/\text{Mod}, \text{Min})$$

wherein, M is the number of pixels contained in the binary image in the first direction, N is an adjustment coefficient and $0 < N \leq 1$, Mod is the preset number of modules contained in the binary image in the first direction, Min is the number of pixels contained in one module of the binary image in the first direction.

In the system for decoding two dimensional code, the correction pattern coordinate obtaining subunit is configured to obtain reference coordinates based on the relative location relationship between the central point of the correction pattern and the central points of the detection patterns, and locate the correction pattern precisely in a predetermined area with respect to the reference coordinates to obtain coordinates of the central point of the correction pattern.

In the system for decoding two dimensional code, the correction pattern coordinate obtaining subunit is further configured to obtain a horizontal reference coordinate according to the horizontal distance between the central point of the correction pattern and the central point of the first detection pattern; and obtain a vertical reference coordinate according to the vertical distance between the central point of the correction pattern and the central point of the first detection pattern, wherein the horizontal distance and the vertical distance are determined according to the following equations:

the horizontal distance is $\epsilon_h = \epsilon(X_R - X_A)$ the vertical distance is $\epsilon_z = \epsilon(Y_R - Y_A)$ wherein, $X_R = X_B - X_A + X_C$, $Y_R = Y_B - Y_A + Y_C$, $(X_B, Y_B)$ is the coordinates of the central point of the second detection pattern; $(X_C, Y_C)$ is the coordinates of the central point of the third detection pattern; $\epsilon$ is an offset factor of the correction pattern, and $\epsilon = (N-3)/K$, K is the number of modules contained in the binary image in the first direction.

In the system for decoding two dimensional code, in the correction pattern coordinate obtaining subunit, the predetermined area is set as a square region including the reference coordinates, wherein the square region includes at least 64 modules.

In the system for decoding two dimensional code, the correction pattern coordinate obtaining subunit is further configured to detect, in the predetermined area along the first direction, a third line segment having a length ratio of white:black:white meeting a second predetermined ratio, and determine the central point of the black portion of the third line segment; and take the central point of the black portion of the third line segment as a reference to obtain a line perpendicular to the third line segment, detecting along the line a fourth line segment having a length ration of white:black:white meeting the second predetermined ratio, and taking the central point of the black portion of the fourth line segment as the central point of the correction pattern.

In the system for decoding two dimensional code, the correction pattern obtaining unit comprises:

a conversion coefficient obtaining subunit for obtaining conversion coefficients according to coordinates of the central point of each detection pattern and coordinates of the central point of the correction pattern in the initial coordinate system and the correction coordinate system;

a correction subunit for according to the conversion coefficients, for each point in the correction coordinate system, finding out a module of the binary image in which its corresponding point in the initial coordinate system locates, and assigning the grayscale value of that module to the point to realize correction of the binary image.

In the system for decoding two dimensional code, in the correction subunit, the grayscale value of the central pixel of the module is set as the grayscale value of the module.

In the system for decoding two dimensional code, in the correction subunit, the conversion coefficients are obtained following a rule of perspective transformation.

The above technical solutions of this invention have the following technical effects compared to those in the prior art:

(1) With the method and system for decoding a code of this invention, in the binarization process of a code image, through performing a dividing operation on the code image, each block region has a different grayscale threshold. Thus, in the restoring process of the code image, for each block region, whether a pixel in the block region is determined as black or white is not solely based on the grayscale value of the pixel itself, but also an average grayscale value of a predetermined area specified for the block region where the pixel locates. That is to say, when the predetermined area in which the block region locates has generally a larger grayscale value, the grayscale threshold corresponding to the block region may become larger, and vice versa. That is, because the grayscale threshold of a block region is closely related to grayscale values in a background of this block region, external circumstance interference may be excluded from an obtained binary result, producing a clear binary image accordingly. Thus, an accurate foundation is provided for decoding the code, and the accuracy of decoding is ensured.

(2) with the code decoding method and system of this invention, in the detection of detection patterns, detection is performed, at first, in a first direction and then in a second direction based on the first direction detection, to detect a line segment having a length ratio of black:white:black:white:black meeting a predetermined ratio, determine the central points of the detection patterns, and thereby find out all detection patterns. The detection of detection patterns does not need line-by-line traversal detection in the entire QR code image in the vertical direction and the horizontal direction respectively, and merely line-by-line traversal detection in a first direction is required. Instead of a further line-by-line traversal detection process after the central point of the first line segment is detected, detection is performed based on the detected central point of the first line segment. Thus, detection steps may be greatly saved to simplify the detection procedure and improve computing speed. Thus, fast detection of detection patterns may be realized for QR code image, and the decoding of the two dimensional code may be speeded up.

(3) with the code decoding method and system of this invention, in the detection of the correction pattern, reference coordinates are obtained according to the relative location relationship between the central point of the correction pattern and the central points of the detection patterns. Because detection patterns must be detected at first in the recognition of a two dimensional code, the locations of the detection patterns have been obtained before the detection of the correction pattern, the correction pattern on the lower right corner has a fixed location relationship to the three detection patterns. With the location relationship between the detection patterns and the correction pattern, reference coordinates of the correction pattern may be derived. Thus, the detection of the correction pattern may be accelerated effectively, and resources may be integrated and optimized efficiently.

(4) with the code decoding method and system of this invention, in the correction of the two dimensional code, conversion coefficients are directly obtained by using three detection patterns and a correction pattern. Due to the relatively mature detection techniques of detection and correction patterns, high detection accuracy may be achieved with simple and fast computation, as well as less memory consumption, at the same time, shortcomings caused by edge detection algorithms may be avoided, and thus a better correction effect may be obtained.

BRIEF DESCRIPTION OF THE DRAWINGS

For a clear understanding of the content of this invention, this invention will be further described according to particular embodiments in reference to drawings.

FIG. 8 is a schematic diagram of obtaining coordinates of the central point of a correction pattern according to an embodiment;

FIG. 9 is a schematic diagram of an initial coordinate system where the two dimensional code image locates;

FIG. 10 is a schematic diagram of a correction coordinate system where the image that is corrected from the two dimensional code image locates;

DESCRIPTION OF THE EMBODIMENTS

Embodiment 1

Figure 1:
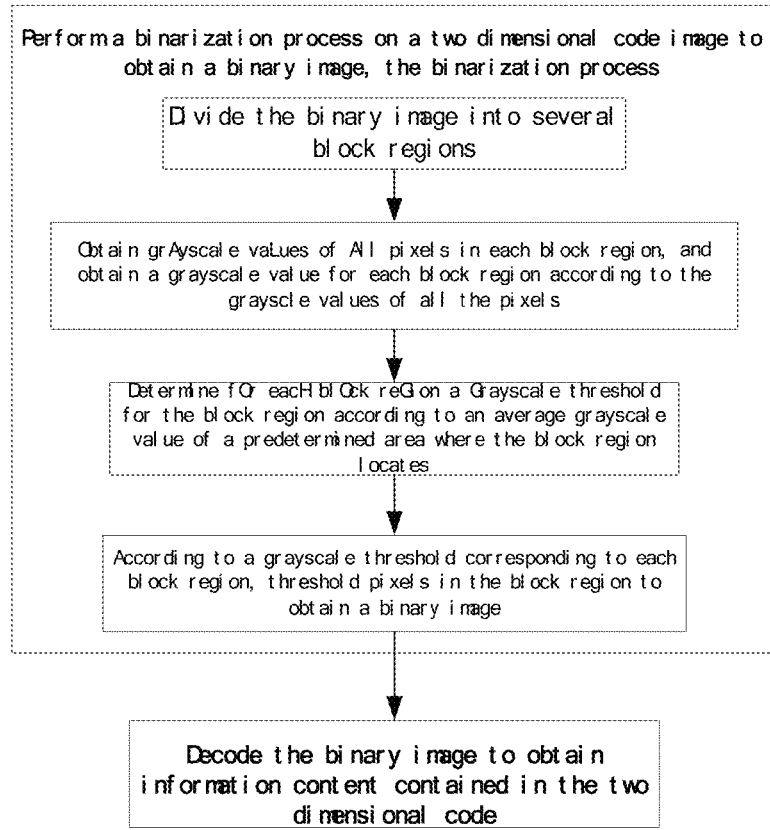
FIG. 1 is a flowchart of a method for decoding a two dimensional code of this invention.

A method of decoding two dimensional code is provided in this embodiment, as shown in FIG. 1, comprising the following steps:

performing a binarization process on a two dimensional code image to obtain a binary image, the binarization process comprising:
dividing the two dimensional code image into a plurality of block regions;
obtaining grayscale values of all pixels in each block region, and obtaining a grayscale value for each block region according to the grayscale values of all the pixels;
determining, a grayscale threshold for each block region according to an average grayscale value of a predetermined area where the block region locates;
binarizing pixels in the block region to obtain a binary image, according to a grayscale threshold corresponding to each block region;

decoding the binary image to obtain information content contained in the two dimensional code. The information content comprises critical information, such as the version information, format information, error correction level information, content information of the two dimensional code. Determining the correctness of two dimensional code and parsing the code image content based on coding rules are mature applications in the prior art, which are not focuses of this invention, and thus will not be described in detail herein.

In this embodiment, because each block region has a different grayscale threshold, in the binarizing process of the two dimensional code image, for each block region, whether a pixel in the block region is determined as black or white is not solely based on the grayscale value of the pixel itself, but also an average grayscale value of a predetermined area in which a block region containing the pixel locates. For example, when a pixel has a grayscale value 150, if the average grayscale value of a predetermined area where the block region locates is 180 (i.e., the grayscale threshold is 180), in the binarization process of the block region, because the grayscale value of the pixel is less than the grayscale threshold, it should be set to black. For the same pixel having a grayscale value 150, if the average grayscale value of a predetermined area where the block region locates is 100 (i.e., the grayscale threshold is 100), the grayscale value of the pixel is larger than the grayscale threshold and the pixel should be determined as white in the binarization process. Each pixel in the block region is determined according to such a decision criterion to get its binary value. Then, such determination is made for different pixels in each block region to binarize the entire two dimensional code image according to determined binary values, and thus realize the binarization process of the two dimensional code image.

In this embodiment, the binarization process comprises the following steps:

constructing a contrast factor according to the relationship between grayscale values of pixels in the two dimensional code image, wherein the contrast factor is proportional to the difference between a maximum grayscale value and a minimum grayscale value of the two dimensional code image;

the step of obtaining grayscale values of all pixels in each block region, and obtaining a grayscale value for each block region according to the grayscale values of all the pixels comprises:

determining a grayscale value for a block region, according to the relationship between the contrast factor and the difference between a maximum grayscale value and a minimum grayscale value in the block region, in conjunction with grayscale values of other block regions adjacent to the block region.

Further, in this embodiment, in the process of determining a grayscale value for a block region according to the relationship between the contrast factor and the difference between a maximum grayscale value and a minimum grayscale value in the block region, in conjunction with grayscale values of other block regions adjacent to the block region, a grayscale value $\overline{y_{ij}}$ is obtained for a block region (i,j) according to the following equation:

$$\overline{y_{ij}} = \begin{cases} \frac{S_{ij}}{m^2} & \max_{ij} - \min_{ij} > C \\ bg & \max_{ij} - \min_{ij} <= C \,\&\&\, \min_{ij} < \left( bg = \frac{\overline{y_{i-1j-1}} + \overline{y_{ij-1}}*2 + \overline{y_{i-1j}}}{4} \right) \\ \frac{\min_{ij}}{2} & \max_{ij} - \min_{ij} <= C \,\&\&\, \min_{ij} >= \left( bg = \frac{\overline{y_{i-1j-1}} + \overline{y_{ij-1}}*2 + \overline{y_{i-1j}}}{4} \right) \end{cases}$$

wherein, i represents the number of a row the block region locates, j represents the number of a column the block region locates, $S_{ij}$ represents the sum of grayscale values of all pixels in the block region, C represents the contrast factor, $\max_{ij}$ represents the maximum grayscale value in the block region, $\min_{ij}$ represents the minimum grayscale value in the block region, m represents that the block region includes m×m pixels, wherein m is an integer larger than 1.

In this embodiment, in the dividing step, the two dimensional code image is divided into block regions with the same size, each block region comprising m×m pixels, wherein m is an integer larger than 1. The number of block regions is:

number of horizontal blocks: sub$W=W/m$, wherein $W$ represents the total number of pixels in the horizontal direction.

number of Vertical blocks: sub$H=H/m$, wherein $H$ represents the total number of pixels in the vertical direction.

The size of a block image may be determined according to the product of the length and width of the grayscale image. For example, a two dimensional code grayscale image having 640×640 pixels may be divided into block regions each having 4×4 pixels; a two dimensional code grayscale image having 752×480 pixels may be divided into block regions each having 40×40 pixels; a two dimensional code grayscale image having 1280×720 pixels may be divided into block regions each having 80×80 pixels. However, in order to ensure binarization precision and reduce unnecessary computation as much as possible, in the dividing step, each block region preferably includes 8×8 pixels.

A contrast factor is concerned in the acquisition of the grayscale value $\overline{y_{ij}}$. As described above, the contrast factor is related to the difference between a maximum grayscale value and a minimum grayscale value of the entire two dimensional code image. For each block region, when the difference between a maximum grayscale value and a minimum grayscale value of pixels in the block region is larger than the contrast factor, it may be conceived that grayscale values of pixels in the block region have poor uniformity and it is hard to select a value to represent the average grayscale value of this block region, so an average grayscale value is calculated through directly dividing the sum of grayscale values of all pixels by the number of those pixels. When the difference between a maximum grayscale value and a minimum grayscale value of pixels in a block region is smaller than the contrast factor, it may be conceived that grayscale values of all pixels in the block region has better uniformity, and a value may be selected as the average grayscale value of the entire block region.

For the convenience of description, a partial neighbourhood is defined for a block region based on several block regions adjacent to the block region. When the minimal grayscale value of the block region is less than the average grayscale value of its partial neighbourhood, i.e., the grayscale values of the block region are lower than the grayscale values of its background, in theory, the block region has lower grayscale values and is expected to be set to black finally. However, because the final binarization result will be decided in conjunction with a threshold, pixels in the block region are finally set to black only if their values are less than a corresponding grayscale threshold. Because the setting of the grayscale threshold takes average grayscale values of all block regions contained in a predetermined area into account, the average grayscale value of the partial neighbourhood may be selected as the average grayscale value of the block region to reasonably expand the threshold to the greatest extent. Setting the average grayscale value of the block region to a larger value may expand the grayscale threshold reasonably and may increase the probability of getting a pixel in the block region determined as black in the binarization process.

On the contrary, when the minimal grayscale value is larger than the average grayscale value of the partial neighbourhood, i.e., the block region has higher grayscale values, and it is expected to be set to white. To reasonably lower the threshold to the greatest extent, the average grayscale value of the block region may be set to be the half of the minimal grayscale value and thus is smaller value, which may lower the threshold of the grayscale value reasonably and increase the probability of getting pixels in the block region determined as white in the binarization process.

In this embodiment, preferably, the contrast factor C is constructed according to the following equation:

$$C = \begin{cases} C_0 & Y_{max} - Y_{min} < Y_0 \\ C_1 & Y_0 < Y_{max} - Y_{min} < Y_1 \\ C_2 & Y_{max} - Y_{min} > Y_1 \end{cases}$$

wherein, $C_0$, $C_1$ and $C_2$ are all constants ranging from 0 to 255, $Y_0$ and $Y_1$ are constants of brightness difference, which are both constants ranging from 0 to 255. Both $Y_0$ and $Y_1$ range from 0 to 255. Because a grayscale image has grayscale values ranging from 0 to 255, an ideal binarization effect may be obtained with $Y_0$=110 and $Y_1$=130. Thus, preferably, the constants of brightness difference are $Y_0$=110 and $Y_1$=130. $C_0$, $C_1$ and $C_2$ range from 0 to 255 and are ascending in sequence. An ideal binarization effect may be obtained with $C_0$=4, $C_1$=14 and $C_2$=24. Thereby, in the equation of the contrast factor C, preferably, $C_0$=4, $C_1$=14 and $C_2$=24.

In this embodiment, preferably, in the process of determining, a grayscale threshold for each block region according to an average grayscale value of a predetermined area where the block region locates:

the predetermined area comprises n×n block regions, wherein n is an integer larger than 1.

The predetermined area comprises n×n block regions, wherein n is an integer larger than 1. As described above, the predetermined area may be selected according to the computational capability of the system and the acceptable time for computing. In general, it is preferred to achieve both faster response and better performance. Certainly, the predetermined area may be further increased in pursuit of the accuracy of the binarization process. However, with an overall consideration of the amount of computation and actual demand, the predetermined area preferably comprises 5×5 block regions.

Figure 2:
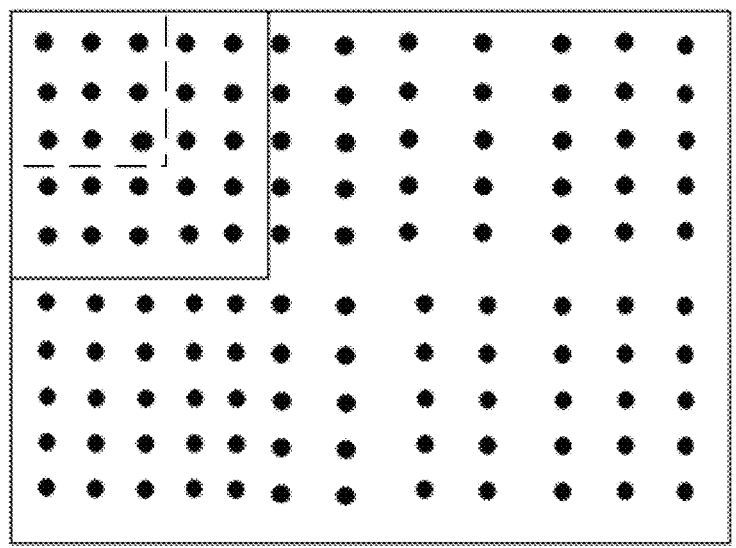
FIG. 2 is a schematic diagram of a predetermined area specified for a block region in an embodiment.

As shown in FIG. 2, each spot represents a block region. In the case of a predetermined area including 5×5 block regions, for a block region (3,3) at row 3 column 3 in the figure as an example, the predetermined area where it locates is a square area shown in the figure, which includes total 25 block regions. Thus, its grayscale threshold is the average grayscale value of the 25 block regions.

Figure 3:
FIG. 3 is an original image of a two dimensional code image.
Figure 4:
FIG. 4 shows an effect diagram after the binarization of a two dimensional code image.

Note that in the case of a block region on an edge or a corner, not all 5×5 block regions centred at the block region can be found in the two dimensional code image, in this case, remaining block regions of the 5×5 block regions centred at the block region may be selected alternatively. For a block region on row 1 column 1 as an example, not all 25 block regions may be found for the block region, and thus block regions shown by a dashed line in the figure are selected as the predetermined area. Thus, grayscale values of the dashed block regions surrounded by the dashed line are summed and then averaged to get a grayscale threshold of the block region. With such a process for block regions on edges or corners, a favourable binary image may be obtained without blurred edges. FIG. 4 shows the result obtained through binarizing a two dimensional code's original image shown in FIG. 3.

With the method for decoding two dimensional code provided in this embodiment, in the binarization process of a two dimensional code image, the two dimensional code image may be recovered clearly and accurately, and target objects in the two dimensional code image may be separated from the background in a better manner to overcome problems of dim or non-uniform illumination.

Embodiment 2

On the basis of embodiment 1, the following modifications may be made.

The process of decoding the binary image to obtain information content contained in the two dimensional code comprises:

determining an initial coordination system and a correction coordination system in which a corrected image locates, wherein each point in the correction coordination system corresponds to a point in the initial coordination system; and determining coordinates of central points of detection patterns and a corrected pattern in the initial coordinate system and the correction coordinate system respectively, wherein the detection patterns comprise a first detection pattern, a second detection pattern, and a third detection pattern;

correcting the binary image according to the coordinates of the central points of each detection pattern and the correction pattern in the initial coordinate system and the correction coordinate system to obtain a corrected pattern;

obtaining information contained in the corrected pattern.

Note that the method of this embodiment is mainly applied to QR codes.

Preferably, in this embodiment, in the process of determining coordinates of central points of the detection patterns, the step of determining a central point of each detection pattern comprises:

detecting the binary image along a first direction to detect a first line segment having a length ratio of black:white:black:white:black meeting a first predetermined ratio, and determining the central point of the first line segment;

detecting along a second direction a line running through the central point of the first line segment to get a second line segment having a length ratio of black:white:black:white:black meeting the first predetermined ratio, and using the central point of the second line segment as the central point of the detection pattern.

This embodiment takes advantage of characteristics of detection patterns to perform fast detection on the detection patterns. The detection patterns are characterized in that each detection pattern may be considered as being composed of three superimposed concentric squares with 7×7 dark modules, 5×5 light modules and 3×3 dark modules respectively. Herein, a module is a basic information storage unit of a two dimensional code image. Thus, in theory, a black:white:black:white:black ratio of 1:1:3:1:1 should be satisfied.

Because in a binary image, for each pixel in a module, it has a grayscale value of 0 or 255, in essentially, determining whether the line segment ratio meets a first predetermined ratio implies determining black or white according to grayscale values of pixels, and finally derive whether the black to white ratios meet the first predetermined ratio.

Figure 5:
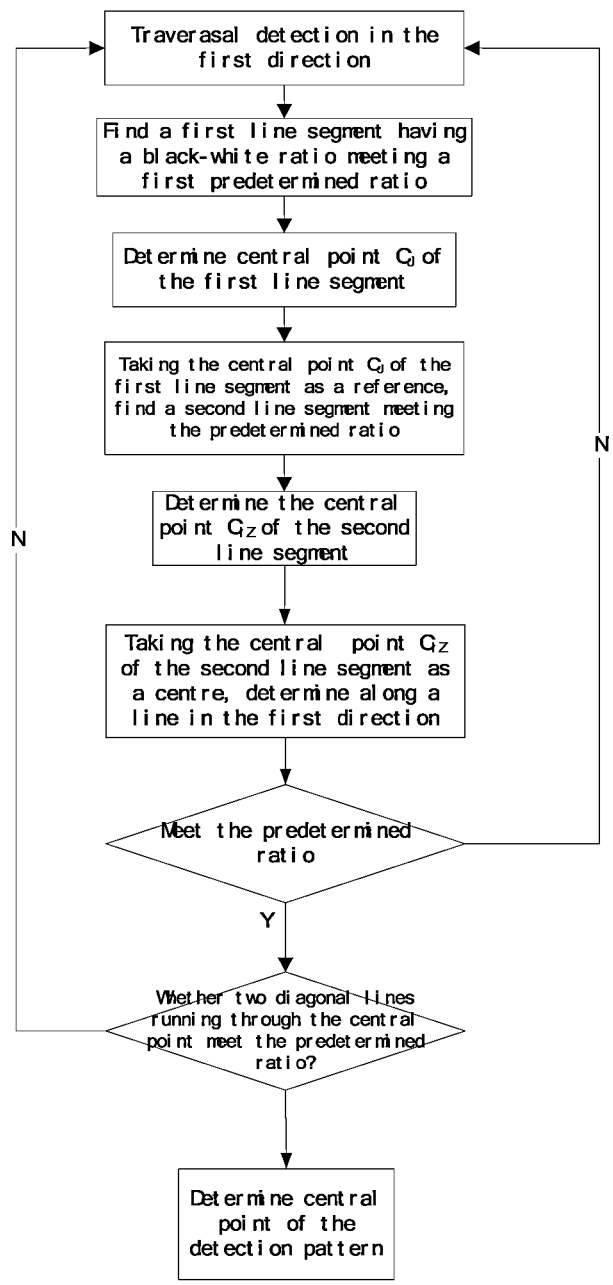
FIG. 5 is a flowchart of a detection method of two dimensional code detection patterns of an embodiment.

In the detection method of the two dimensional code detection patterns according to this embodiment, as shown in FIG. 5, further comprises the following steps:

detecting on a line running through the central point of the second line segment along the first direction, if a length ratio of black:white:black:white:black meeting the first predetermined ratio is detected, taking the central point of the second line segment as the central point of the detection pattern; otherwise, returning to the step of detecting the two dimensional code along the first direction.

Also, the method further comprises: along a +45 degree or −45 degree diagonal direction with respect to the first direction, detecting on a line running through the central point of the second segment; if a length ratio of black:white:black:white:black meeting the first predetermined ratio is detected, taking the central point of the second line segment as the central point of the detection pattern; otherwise, returning to the step of detecting the two dimensional code along the first direction. The above detection is provided to ensure the accuracy of the fast detection.

Below, a description will be given with reference to FIG. 5. FIG. 5 shows a complete flowchart. Herein, the first direction may be the horizontal direction or the vertical direction. In FIG. 5, at first, the binary image is detected along a first direction to detect a first line segment having a length ratio of black:white:black:white:black meeting the first predetermined ratio. The central point of the first line segment $C_j$ is determined, which is obviously the central point of the detection pattern in the first direction, however, is not necessary the central point of the detection pattern in the second direction. Taking the central point $C_j$ of the first line segment obtained in the first direction detection as a reference, a line in a second direction is obtained. Whether there is a second line segment having a length ratio of black:white:black:white:black meeting the first predetermined ratio is detected on the line; if a second line segment is detected, the central point $C_{IZ}$ of the second line segment is determined. Because the second line segment is obtained taking the central point of the detection pattern in the first direction as a reference, the second line segment must lie on a central line of the detection pattern in the first direction. Thus, in theory, the central point of the second line segment selected as such must be the centre of the detection pattern in the vertical direction and therefore the geometric centre of the detection pattern.

In the above solution of this embodiment, the central point $C_{IZ}$ is determined as the central point of the detection pattern in theory, which is merely verified in the second direction, without confirming whether the condition of a length ratio of black:white:black:white:black meeting the first predetermined ratio is satisfied in the first direction, so detection errors may occur. In order to prevent such situations, a determination is further made on a line where the central point $C_{IZ}$ of the second line segment lies on along the first direction to determine whether there is a line segment having a length ratio of black:white:black:white:black meeting the first predetermined ratio on the line. Meanwhile, diagonal detection is further provided to determine whether the condition of a length ratio of black:white:black:white:black meeting the first predetermined ratio is satisfied on diagonal lines running through the central point $C_{IZ}$ of detection pattern at ±45 degrees with respect to the first direction. If the central point of the second line segment is the central point of the detection pattern, the above condition must be satisfied; otherwise, it is not the central point of the detection pattern, which may further ensure the accuracy of the detection. Thereby, the detection pattern may be detected rapidly, while ensuring detection accuracy to a certain extent and effectively lowering the rate of detection errors.

A first predetermined ratio is provided in this embodiment, which has a certain error compared with the ratio 1:1:3:1:1. The first predetermined ratio in this embodiment is such configured that the ratio of the length of each black section to the total length of the black sections and the ratio of the length of each white section to the total length of the white sections are both within a range from 0.5:7 to 2:7. That is, when a line segment with five alternative black-white patterns not strictly meeting the ratio 1:1:3:1:1 is detected, the number of pixels in the entire line segment may be obtained and then the number of pixels in each black or white section in the line segment may be obtained to determine a ratio of this black or white section to the entire line segment, and it is enough for these ratios to meet the first predetermined ratio.

This embodiment takes full advantage of the characteristic of the detection patterns themselves in the detection of detection patterns, i.e., the length ratio of black to white of a line segment in the detection pattern meets a 1:1:3:1:1 ratio. In consideration of distortions or deformations, a first predetermined ratio is set, which may eliminate impacts caused by distortions or slight deformations on the basis of ensured detection accuracy.

Preferably, in this embodiment, the step of determining coordinates of the central point of each detection pattern further comprises:

setting a detection step size for detecting the binary image along the first direction, wherein the detection step size is less than or equal to the number of pixels in one module of the binary image in the first direction.

In this embodiment, in the step of setting a detection step size for detecting the binary image along the first direction, the detection step size is obtained according to the number of pixels in the binary image in the first direction and the number of pixels in the one module in the first direction.

In this embodiment, in the step of setting a detection step size for detecting the binary image along the first direction, the detection step size is obtained through the following equation:

$$L = \text{Max}(M \times N / \text{Mod}, \text{Min})$$

wherein, M is the number of pixels contained in the binary image in the first direction, N is an adjustment coefficient and $0 < N \le 1$, Mod is the preset number of modules contained in the binary image in the first direction, Min is the number of pixels contained in one module of the binary image in the first direction.

Wherein, M is the number of pixels contained in the two dimensional code in the first direction, N is an adjustment coefficient and $0 < N \le 1$, Mod is the preset number of modules contained in the two dimensional code in the first direction, Min is the number of pixels contained in one module of the two dimensional code in the first direction.

M×N/Mod represents an average number of pixels in one module scaled at a ratio, which is compared with the number of pixels in one module in the first direction to select a larger one as the detection step size, and thus to reduce the number of lines that are scanned. Wherein, M×N/Mod may be an average number of pixels in one module that is scaled at a ratio in the horizontal direction, or an average number of pixels in one module in the vertical direction. In order to ensure the overall accuracy of the detection, it is necessary to ensure a reasonable setting of a detection step size while reducing the number of lines that will be scanned as much as possible. Below, a particular description will be given in conjunction with different versions of two dimensional code images.

As well known, there are 40 specifications of two dimensional code image versions: version 1, version 2 . . . version 40. Version 1 has 21×21 modules, Version 2 has 25×25 modules, and so on. The symbols in each version increase by 4 modules on each edge compared with a previous version, until version 40 which has 177×177 modules. Thus, the larger version number, the more modules in the horizontal and vertical directions, and thus the more information contained therein, and the larger two dimensional code image will be. Because before the detection patterns are detected successfully, the actual version of a two dimensional code image cannot be recognized, in practice, only lower versions are commonly adopted, usually not higher than version 10. It is preferred to set a smaller detection step size to ensure the accuracy of the detection, i.e., the fewer modules contained in the two dimensional code in the first direction, the better, and thus resulting in a minimal detection step size. However, on the basis of ensured detection accuracy, it is desired to speed up the detection, as a result, it is desired to set a step size as large as possible, in which case the more modules contained in the two dimensional code in the first direction the better. Based on the two aspects above, preferably, the predetermined number of modules contained in a two dimensional code in the first direction is Mod=57, corresponding to the situation of version 10. The applicants process existing two dimensional code images with the above setting, which may not only reduce computing steps but also ensure the accuracy of the detection, with a degree of accuracy of over 99%.

If the detection step finally determined is larger than the length of a module, the central square of a detection pattern may be skipped in the detection, causing unsuccessful detection of the detection pattern. Taking this situation into consideration also, in order to prevent missing caused by an unreasonable detection step size setting, a corresponding value must be set to ensure that the step size is not larger than the length of a module. After many times of numerical experiments, preferably, in the step of setting a detection step size for detecting the two dimensional code along a first direction, the adjustment coefficient N is set to 0.75 in this embodiment.

In the method of decoding two dimensional code of this embodiment, without line-by-line traversal detection in the entire two dimensional code image in the vertical direction and the horizontal direction respectively, merely a line-by-line traversal detection in a first direction is needed for detecting the detection patterns. Instead of further line-by-line traversal detection after the central point of the first line segment is detected, a detection process is performed based on the detected central point of the first line segment. Thus, detection processes may be greatly saved to simplify the detection procedure and improve computing speed. In addition, the detection in the first direction may be performed according to a detection step, the value of which is set in a reasonable and flexible manner to further ensure the accuracy and efficiency of the detection of the detection patterns.

Embodiment 3

Based on embodiment 2, the following modifications may be made.

The process of determining coordinates of the central point of the correction pattern in the initial coordinate system comprises:

obtaining reference coordinates based on the relative location relationship between the central point of the correction pattern and the central points of the detection patterns;

locating the correction pattern precisely in a predetermined area with respect to the reference coordinates to obtain coordinates of the central point of the correction pattern.

Figure 6:
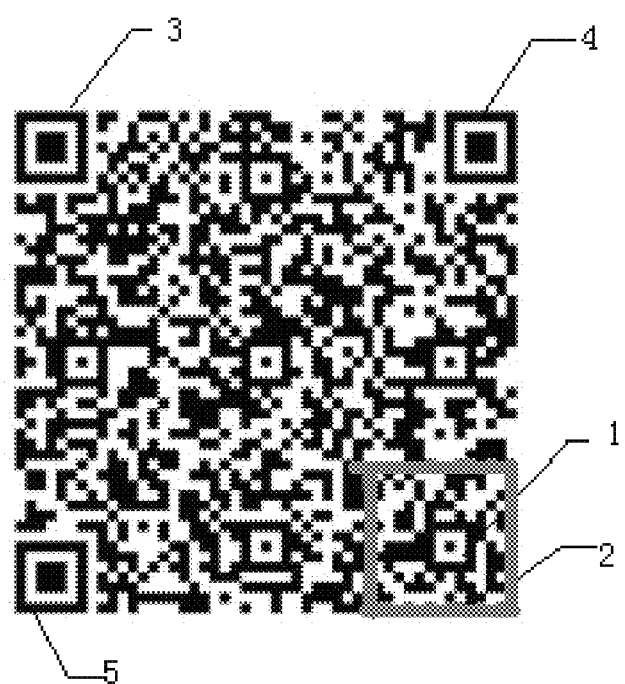
FIG. 6 is a schematic diagram showing positions of locating points and the detection patterns.

As shown in FIG. 6, a first detection pattern 3 is a detection pattern located on the upper left corner of the whole two dimensional code image. A second detection pattern 4 and a third detection pattern 5 may be detection patterns located on the upper right and lower left corners of the whole two dimensional code image respectively, or detection patterns located on the lower left and upper right corners of the whole two dimensional code image respectively. Because standard two dimensional codes are in square structures, and the distance between the central points of the correction pattern and the second detection pattern 4 in the vertical direction differs from the distance between the central points of the third detection pattern 5 and the first detection pattern 3 in the vertical direction by 3 modules. The distance between the central points of the correction pattern and the third detection pattern 5 in the horizontal direction differs from the distance between the central points of the second detection pattern 4 and the first detection pattern 3 in the horizontal direction by 3 modules.

The process of obtaining reference coordinates based on the relative location relationship between the central point of the correction pattern and the central points of the detection pattern comprises:

obtaining a horizontal reference coordinate according to the horizontal distance between the central point of the correction pattern and the central point of the first detection pattern; obtaining a vertical reference coordinate according to the vertical distance between the central point of the correction pattern and the central point of the first detection pattern, wherein the horizontal distance and the vertical distance are determined according to the following equations:

the horizontal distance is $\epsilon_h = \epsilon(X_R - X_A)$ the vertical distance is $\epsilon_z = \epsilon(Y_R - Y_A)$ wherein, $X_R = X_B - X_A + X_C$, $Y_R = Y_B - Y_A + Y_C$, $(X_B, Y_B)$ is the coordinates of the central point of the second detection pattern; $(X_C, Y_C)$ is the coordinates of the central point of the third detection pattern; $\epsilon$ is an offset factor of the correction pattern, and $\epsilon = (N-3)/K$, K is the number of modules contained in the binary image in the first direction.

For different two dimensional code versions, the number of correction patterns and their locations are different also. It is not intended to find out all correction patterns in this embodiment, but to find a correction pattern located on the lower right corner of the whole two dimensional code image. The purpose of providing correction patterns is to provide corresponding data in a correction procedure of the decoding process, to enable the recovery of a distorted two dimensional code image, and thus to get ready for a later decoding process.

However, not all correction patterns are needed in the correction of a distorted two dimensional code image. If no edge detection will be performed, it is not necessary to detect all correction patterns, which may otherwise consume a lot of memory and lead to a large amount of computation, causing a lower overall computing speed. In the case of the two dimensional code image having no distortion, the coordinates of a correction pattern is the reference coordinates. However, it is not likely to get a two dimensional code image without any distortion in practice, making a following precise locating process extraordinarily important.

In the process of locating the correction pattern precisely in a predetermined area with respect to the reference coordinates to obtain coordinates of the central point of the correction pattern:

the predetermined area is a square region including the reference coordinates, wherein the square region includes at least 64 modules.

It can be seen from FIG. 6, after the rough locating of the correction pattern, rough reference coordinates are obtained and then the correction pattern is precisely located in a predetermined area with respect to the reference coordinates. It is obvious that the correction pattern on the lower right corner of the two dimensional code falls with the square region, i.e., within the gray box. A too large square region may cause a broader detection range, leading to a large amount of computation and a lower computing speed; a too small square region may cause unsuccessful detection of the correction pattern. Because a correction pattern is a square containing 5×5 modules, preferably, the square region includes at least 64 modules herein. If a correction pattern cannot be detected in a detection area of 64 modules, the square region is expanded to an area including 256 modules or even an area including 1024 modules. A selection can be made for the square region to detect according to the above steps from a smaller area to a larger area, or a square region can be individually specified without expanded detection.

The step of locating the correction pattern precisely in a predetermined area with respect to the reference coordinates to obtain coordinates of the central point of the correction pattern comprises:

detecting, in the predetermined area along the first direction, a third line segment having a length ratio of white:black: white meeting a second predetermined ratio, and determining the central point of the black portion of the third line segment;

taking the central point of the black portion of the third line segment as a reference to obtain a line perpendicular to the third line segment, detecting along the line a fourth line segment having a length ration of white:black:white meeting the second predetermined ratio, and taking the central point of the black portion of the fourth line segment as the central point of the correction pattern.

In the detection, it is possible to detect in the horizontal direction or the vertical direction at first. In this embodiment, referring to FIG. 7 for example, the detection is performed in the horizontal direction at first. From top to bottom, horizontal detection is performed in a predetermined area with respect to the reference central point. Assume that first one of the third line segment meeting the second predetermined ratio is detected, the central point of black section of the line segment is selected, which perhaps is not the central point of the inner black square, but is necessarily the central point of the square in the horizontal direction, based on which a vertical detection is performed, and if there is a second line segment having a white:black:white ratio meeting the second predetermined ratio on the perpendicular line, the central point of the black section of the fourth line segment must be the central point of the black square, i.e., the central point of the correction pattern.

Figure 7:
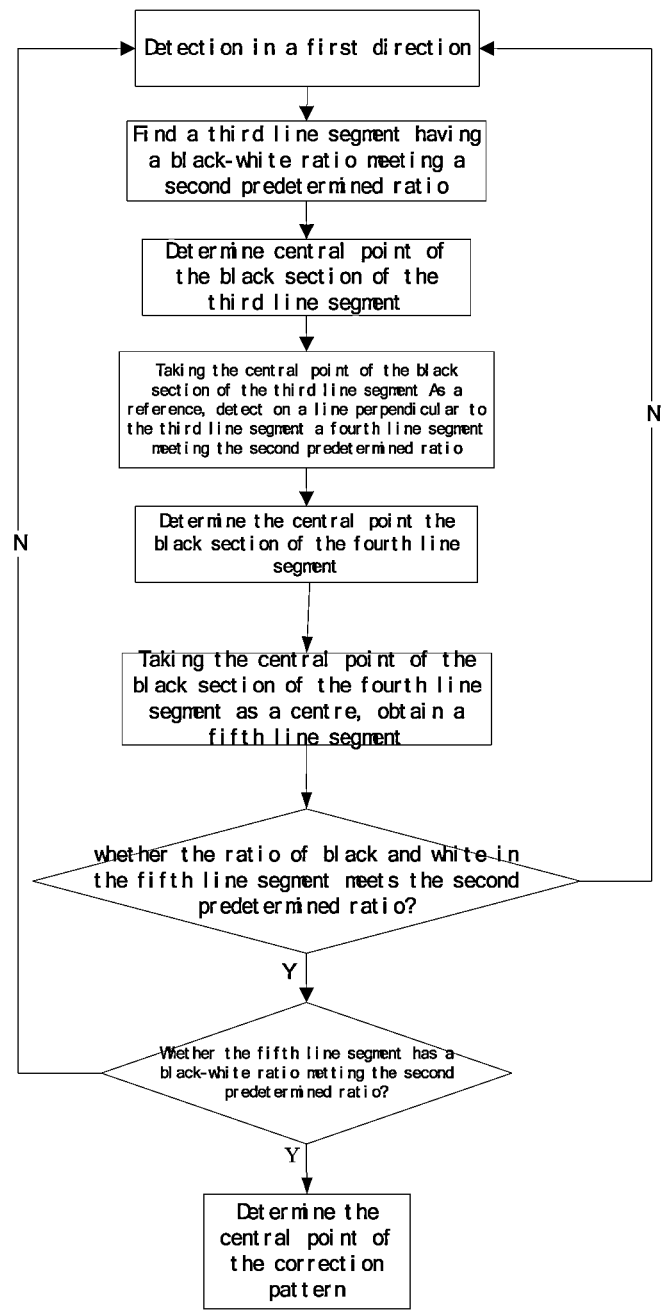
FIG. 7 is a flowchart of obtaining coordinates of the central point of a correction pattern according to an embodiment.

In this embodiment, preferably, as shown in FIG. 7, locating the correction pattern precisely in a predetermined area with respect to the reference coordinates to obtain coordinates of the central point of the correction pattern further comprises the following steps:

taking the central point of the black section of the fourth line segment as a reference location, obtaining a third detection line perpendicular to the fourth line segment; detecting on the third detection line a fifth line segment having a length ratio of white:black:white meeting the second predetermined ratio, wherein if the fifth line segment is detected, the central point of the black section of the fourth line segment is the central point of the correction pattern; otherwise, the process returns to the step of detecting in the predetermined area along the first direction.

taking the central point of the black section of the fourth line segment as a reference, obtaining a fourth detection line at +45 degree or −45 degree with respect to the first direction; detecting on the fourth detection line a sixth line segment having a length ratio of white:black:white meeting a predetermined ratio; wherein if the sixth line segment is detected, the central point of the black section of the fourth line segment is the central point of the correction pattern; otherwise, the process returns to the step of detecting in the predetermined area along the first direction.

Through complement detection on the first direction and a diagonal direction of the central point of the correction pattern, the accuracy of the detected central point of the correction pattern may be further ensured, and the rate of detection errors may be effectively lowered.

However, due to errors introduced in the shooting of the two dimensional code image or in the binarization process, the central black module of a correction pattern may be very large or merely a spot, and may be out of the central area, in which case the correction pattern may not be detected according to the above method. In order to realize effective correction pattern detection in such case, this embodiment provides the following method:

determining edge lines of the correction pattern in the first direction according to two end points of the third line segment;

determining edge lines of the correction pattern in the second direction according to two end points of the fourth line segment;

obtaining a quadrangle box of the correction pattern according to the edge lines in the first direction and the edge lines in the second direction, wherein the geometrical centre of the quadrangle box is an approximate central point of the correction pattern;

obtaining the midpoint of a line connected between the central point of the black section of the second line segment and the approximate central point as the central point of the correction pattern.

As shown in FIG. 8, according to two end points M, N of the third line segment in the horizontal direction, and two end points P, Q of the fourth line segment in the vertical direction, positions of four edges of an internal white square within the correction pattern may be determined. The horizontal coordinate of the midpoint between M and N is the horizontal coordinate of the approximate central point, and the vertical coordinate of the midpoint between P and Q is the vertical coordinate of the approximate central point. The central point of the internal black square and an approximate central point of the whole correction pattern are obtained, and the midpoint between the two points is the central point of the correction pattern, with the advantage of enabling appropriate processing of impacts caused by serious distortion of the central black module of the correction pattern to improve detection capability under various complex situations and ensure effective and accurate detection of the correction pattern in this embodiment.

The correction pattern includes: an outermost square with 5×5 black modules, a middle square with 3×3 white modules, and an innermost black square with 1 module. If the horizontal detection/vertical detection is performed thereon, the correction pattern should meet a white:black:white ratio of 1:1:1 inside, and has a length of 3 modules. The two dimensional code does not have such a line segment that meets this condition at other positions. However, it should be seen from the figure, due to interference, the inner black square of the correction pattern is not at the centre of the white square. In practice, most two dimensional codes are interfered, i.e., line segments in most of correction patterns do not meet the above ratio regarding black and white. Thereby, a second predetermined ratio is provided with an allowable range of error based on the 1:1:1 ratio. In this embodiment, the second predetermined ratio is such configured that the sum of lengths of the white sections and the black section is from 0.7L to 1.3L, wherein L is the length of three modules, and the lengths of the white section and the black section are both less than or equal to the length of 2 modules. That is, the length of each white section and the length of each black section in the white:black:white pattern should not be larger than the length of 2 modules, and the total length of the white:black:white pattern is between 2.1 modules to 3.9 modules. If there is a white section, a black section or the length of a white:black:white line segment exceeding the above limits, it is considered that the second predetermined ratio is not satisfied. The above setting of the second predetermined ratio is derived from many numerical experiments, which may ensure favourable detection accuracy.

Embodiment 4

Based on any of embodiments 1 to 3, the following modifications are made.

Correcting the binary image according to the coordinates of the central point of each detection pattern and the correction pattern in the initial coordinate system and the correction coordinate system to obtain a corrected pattern comprises:

obtaining conversion coefficients according to coordinates of the central point of each detection pattern and coordinates of the central point of the correction pattern in the initial coordinate system and the correction coordinate system;

according to the conversion coefficients, for each point in the correction coordinate system, finding out a module of the binary image in which its corresponding point in the initial coordinate system locates, and assigning the grayscale value of that module to the point to realize correction of the binary image.

As well known, the decoding process of a two dimensional code image is performed based on a standard code image. The purpose of correcting a two dimensional code image is to correct an image with a certain amount of skewing, damage or distortion to obtain a standard code image and make sure that a later decoding process may be performed on the entire two dimensional code image successfully. Thus, in the correction of the two dimensional code image in this embodiment, first of all, two coordinate systems are determined.

An initial coordinate system where the two dimensional code image locates is shown in FIG. 9, through detecting in this figure, coordinates of a corresponding point may be obtained. FIG. 10 shows a correction coordinate system where a corrected image locates, wherein each square represents a point, and not all points are shown in this figure, wherein the number of points is equal to the number of modules in the two dimensional code image. In the two figures, 0 corresponds to a detection pattern on the upper left corner, 1 corresponds to a detection pattern on the upper right corner, 2 corresponds to a correction pattern, and 3 corresponds to a detection pattern on the lower left corner. As shown in FIG. 3, after the two dimensional code is corrected, the centre of the detection pattern on the upper left corner is separate from the upper edge of the two dimensional code by 4 modules and the left edge by 4 modules. Thus, a point on row 4 column 4 in the correction coordinate system corresponds to the central point of the upper left detection pattern of the two dimensional code image in the initial coordinate system. If the grayscale value of this point is 0, the grayscale value of the point on row 4 column 4 in the correction coordinate system is also 0; if the grayscale value of this point is 255, the grayscale value of the point on row 4 column 4 in the correction coordinate system is also 255. In this embodiment, the central point of the detection pattern must be black, and thus the corresponding point on row 4 column 4 in the correction coordinate system is black also. And so on, a grayscale value may be obtained for each point in the correction coordinate system according to the above operation, after which a corrected two dimensional code image shown in FIG. 4 is obtained.

In the method for decoding two dimensional code, in the process of according to the conversion coefficients, for each point in the correction coordinate system, finding out a module of the binary image in which its corresponding point in the initial coordinate system locates, and assigning the grayscale value of that module to the point to realize correction of the binary image: the grayscale value of the module is the grayscale value of the central pixel of the module. The pixel value of the central point of a module is directly used as the grayscale value of the module, because in a two dimensional code image, each module is the smallest image unit, which has a very small size compared to the entire two dimensional code image and has very small variations in grayscale values of all pixels contained therein. Thus, selecting the grayscale value of a pixel therein as a representative will not introduce an error, which may still ensure the accuracy of the correction, greatly lower the amount of computation, and improve correction efficiency.

In this embodiment, preferably, in the process of obtaining conversion coefficients according to coordinates of the central point of each detection pattern and coordinates of the central point of the correction pattern in the initial coordinate system and the correction coordinate system, the conversion coefficients are obtained following a rule of perspective transformation. Because two dimensional code images are taken with short object distances, an apparent perspective phenomenon may be observed. Thus, a perspective transformation must be performed on a photographed two dimensional code image. The so-called perspective transformation means converting each coordinate in a current coordinate system of the two dimensional code image to a correction coordinate system and obtain corrected coordinates. It is necessary to obtain precise perspective conversion coefficients to realize the perspective transformation process. In this embodiment, conversion coefficients are derived through computation in conjunction with detection patterns and a correction pattern that may be detected accurately.

Figure 11:
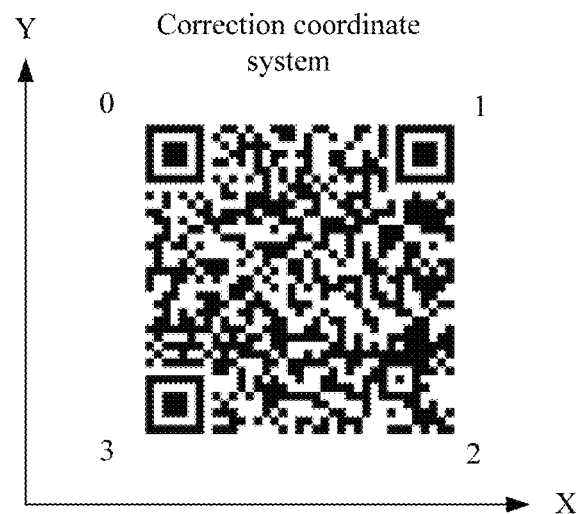
FIG. 11 shows an effect diagram of a corrected two dimensional code image.

An initial coordinate system where the two dimensional code image locates is shown in FIG. 9, and coordinates of a corresponding point may be obtained through detecting in this figure. FIG. 3 shows a correction coordinate system where a corrected image locates, wherein each square represents a point, and not all points are shown in this figure, wherein the number of points is equal to the number of modules in the two dimensional code image. In the two figures, 0 corresponds to a detection pattern on the upper left corner, 1 corresponds to a detection pattern on the upper right corner, 2 corresponds to a correction pattern, and 3 corresponds to a detection pattern on the lower left corner. As shown in FIG. 3, after the two dimensional code is corrected, the centre of the detection pattern on the upper left corner is separate from the upper edge of the two dimensional code by 4 modules and the left edge by 4 modules. Thus, a point on row 4 column 4 in the correction coordinate system corresponds to the central point of the upper left detection pattern of the two dimensional code image in the initial coordinate system. If the grayscale value of this point is 0, the grayscale value of the point on row 4 column 4 in the correction coordinate system is also 0; if the grayscale value of this point is 255, the grayscale value of the point on row 4 column 4 in the correction coordinate system is also 255. In this embodiment, the central point of the detection pattern must be black, and thus the corresponding point on row 4 column 4 in the correction coordinate system is black also. And so on, a grayscale value may be obtained for each point in the correction coordinate system according to the above operation, after which a corrected two dimensional code image shown in FIG. 11 is obtained.

Steps of deriving conversion coefficients will be particularly described with equations below. Given that the coordinates of three detection patterns and a correction pattern before the correction are $P0(X_A, Y_A)$, $P1(X_B, Y_B)$, $P2(X_C, Y_C)$, $P3(x3p, y3p)$, and coordinates of the three detection patterns and the correction pattern after the correction are $A0(x0, y0)$, $A1(x1, y1)$, $A2(x2, y2)$, $A3(x3, y3)$.

Coefficients are calculated according to the coordinates of the three detection patterns and the correction pattern after the correction:

$$dy2 = y3 - y2$$

$$dy3 = y0 - y1 + y2 - y3$$

If dy2=0 and dy3=0:

wherein, dy2=0 means a locating point with a distance of 0 to the lower left detection pattern in the vertical direction, i.e., they both are on the same line.

If dy3=0, it means that the vertical distance between the upper left detection pattern and the upper right detection pattern is equal to the vertical distance between the lower left detection pattern and the locating point, but in a reverse direction.

In this situation:

$$\begin{cases} a_{11} = x1 - x0 \\ a_{21} = x2 - x1 \\ a_{31} = x0 \\ a_{12} = y1 - y0 \\ a_{22} = y2 - y1 \\ a_{32} = y0 \\ a_{13} = 0 \\ a_{23} = 0 \\ a_{33} = 1 \end{cases}$$

-continued

Otherwise:

$$\begin{cases} a_{11} = x1 - x0 + a_{13}x1 \\ a_{21} = x3 - x0 + a_{23}x3 \\ a_{31} = x0 \\ a_{12} = y1 - y0 + a_{13}y1 \\ a_{22} = y2 - y1 + a_{23}y3 \\ a_{32} = y0 \\ a_{13} = a_{31} \\ a_{23} = a_{32} \\ a_{33} = 1 \end{cases}$$

Wherein:

$dx1 = x1 - x2$ $dx2 = x3 - x2$ $dx3 = x0 - x1 + x2 - x3$ $dy1 = y1 - y2$ $a13 = \dfrac{dx3 \cdot dy2 - dx2 \cdot dy3}{dx1 \cdot dy2 - dx2 \cdot dy1}$ $a31 = \dfrac{dx1 \cdot dy3 - dx3 \cdot dy1}{dx1 \cdot dy2 - dx2 \cdot dy1}$ Similarly, according to the above equations, corresponding coefficients $b_{11}$, $b_{21}$, $b_{31}$, $b_{12}$, $b_{22}$, $b_{32}$, $b_{13}$, $b_{23}$, $b_{33}$ may be obtained through substituting the coordinates of the three detection patterns and the correction pattern before the correction into the above equations.

$$\begin{cases} b'_{11} = b_{22} \cdot b_{33} - b_{23} \cdot b_{32} \\ b'_{21} = b_{23} \cdot b_{31} - b_{21} \cdot b_{33} \\ b'_{31} = b_{21} \cdot b_{32} - b_{22} \cdot b_{31} \\ b'_{12} = b_{13} \cdot b_{32} - b_{12} \cdot b_{33} \\ b'_{22} = b_{11} \cdot b_{33} - b_{13} \cdot b_{31} \\ b'_{32} = b_{12} \cdot b_{31} - b_{11} \cdot b_{32} \\ b'_{13} = b_{12} \cdot b_{23} - b_{13} \cdot b_{22} \\ b'_{23} = b_{13} \cdot b_{21} - b_{11} \cdot b_{23} \\ b'_{33} = b_{11} \cdot b_{22} - b_{12} \cdot b_{21} \end{cases}$$

Finally, conversion coefficients $C_x$ between images before and after the conversion are calculated from the two sets of parameters $a_{11}, a_{21}, \ldots, a_{33}$ and $b_{11}', b_{21}', \ldots, b_{33}'$:

$$C_X = \begin{pmatrix} c_{11} & c_{12} & c_{13} \\ c_{21} & c_{22} & c_{23} \\ c_{31} & c_{32} & c_{33} \end{pmatrix}$$

$$= \begin{pmatrix} a_{11} & a_{12} & a_{13} \\ a_{21} & a_{22} & a_{23} \\ a_{31} & a_{32} & a_{33} \end{pmatrix} \begin{pmatrix} b'_{11} & b'_{12} & b'_{13} \\ b'_{21} & b'_{22} & b'_{23} \\ b'_{31} & b'_{32} & b'_{33} \end{pmatrix}$$

Given that each row and each column of the two dimensional code contains R modules, the correction coordinate system comprises R×R points. For the ith point $P_i(x_i, y_i)$, coordinates of a point corresponding to this point in the original image may be calculated with the following equations:

$$x'_i = \dfrac{c_{11}x_i + c_{21}y_i + c_{31}}{c_{13}x_i + c_{23}y_i + c_{33}}$$

$$y'_i = \dfrac{c_{12}x_i + c_{22}y_i + c_{32}}{c_{13}x_i + c_{23}y_i + c_{33}}$$

Through assigning each module's grayscale value in the initial coordinate system to the correction coordinate system correspondingly, the correction process may be realized. FIG. 11 shows a result after correction and assignment.

The central point of the correction pattern in this embodiment may be substituted by a point on the lower right corner, in which case, a point corresponding to virtual detection patterns is selected. A point corresponding to virtual detection patterns means a point meeting the following conditions: its horizontal distance to the lower left detection pattern is equal to the horizontal distance between the upper right detection pattern and the upper left detection pattern; its vertical distance to the upper right detection pattern is equal to the vertical distance between the lower left detection pattern and the upper left detection pattern.

Because some two dimensional code image versions do not have a correction pattern provided, such as two dimensional code images of version 1. In other situations, for example, serious distortions may cause the absence of a correction pattern, or the correction pattern cannot be detected successfully as limited by the detection technique employed. Substituting the correction pattern by a point on the lower right corner may achieve a good detection effect.

The method of correcting two dimensional code image of this embodiment does not need edge detection, and may obtain conversion coefficients directly using three detection patterns and a correction pattern. Because detection techniques of detection patterns and correction patterns are mature techniques with high degrees of accuracy, drawbacks caused by edge detection algorithms may be avoided, and favourable correction effect may be obtained.

Embodiment 5

Figure 12:
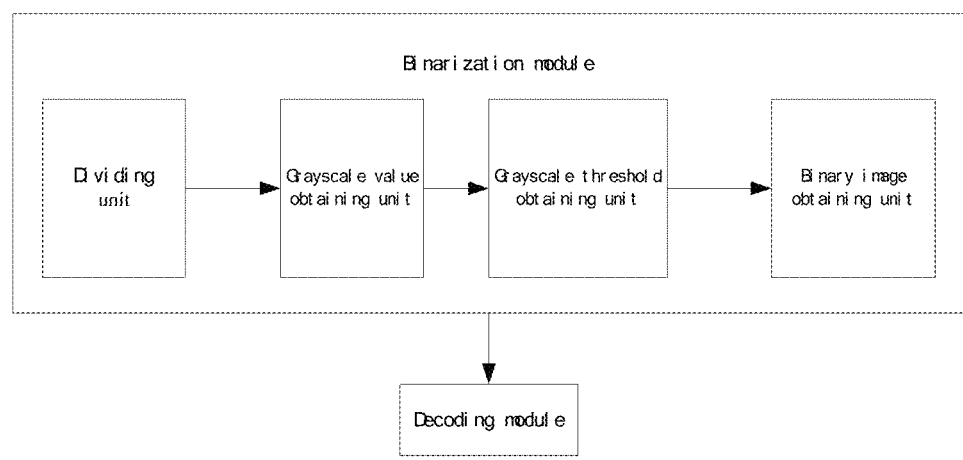
FIG. 12 is a structural diagram of a system for decoding two dimensional code of this invention.

A system for decoding two dimensional code is further provided in this embodiment, as shown in FIG. 12 comprising:

a binarization module for performing a binarization process on a two dimensional code image to obtain a binary image, further comprising:
  a dividing unit for dividing the two dimensional code image into a plurality of block regions;
  a grayscale value obtaining unit for obtaining grayscale values of all pixels in each block region, and obtaining a grayscale value for each block region according to the grayscale values of all the pixels;
  a grayscale threshold obtaining unit for determining, a grayscale threshold for each block region according to an average grayscale value of a predetermined area where the block region locates;
  a binary image obtaining unit for binarizing pixels in the block region to obtain a binary image, according to a grayscale threshold corresponding to each block region;
a decoding module for decoding the binary image to obtain information content contained in the two dimensional code.

Preferably, the binarization module further comprises:
a contrast factor construction module for constructing a contrast factor according to the relationship between grayscale values of pixels in the two dimensional code image, wherein the contrast factor is proportional to the difference between a maximum grayscale value and a minimum grayscale value of the two dimensional code image;

wherein the grayscale value obtaining unit is further configured to determine a grayscale value for a block region, according to the relationship between the contrast factor and the difference between a maximum grayscale value and a minimum grayscale value in the block region, in conjunction with grayscale values of other block regions adjacent to the block region.

In the system for decoding two dimensional code, the contrast factor construction module obtains a grayscale value $\overline{y_{ij}}$ for a block region (i, j) in according to the following equation:

$$\overline{y_{ij}} = \begin{cases} \frac{S_{ij}}{m^2} & \max_{ij} - \min_{ij} > C \\ bg & \max_{ij} - \min_{ij} <= C \:\&\&\: \min_{ij} < \left( bg = \frac{\overline{y_{i-1j-1}} + \overline{y_{ij-1}} * 2 + \overline{y_{i-1j}}}{4} \right) \\ \frac{\min_{ij}}{2} & \max_{ij} - \min_{ij} <= C \:\&\&\: \min_{ij} >= \left( bg = \frac{\overline{y_{i-1j-1}} + \overline{y_{ij-1}} * 2 + \overline{y_{i-1j}}}{4} \right) \end{cases}$$

wherein, i represents the number of a row the block region locates, j represents the number of a column the block region locates, $S_{ij}$ represents the sum of grayscale values of all pixels in the block region, C represents the contrast factor, $\max_{ij}$ represents the maximum grayscale value in the block region, $\min_{ij}$ represents the minimum grayscale value in the block region, m represents that the block region includes m×m pixels, wherein m is an integer larger than 1, preferably, m=8.

In the above equation, the contrast factor C is constructed in the contrast factor construction module according to the following equation:

$$C = \begin{cases} C_0 & Y_{max} - Y_{min} < Y_0 \\ C_1 & Y_0 < Y_{max} - Y_{min} < Y_1 \\ C_2 & Y_{max} - Y_{min} > Y_1 \end{cases}$$

wherein, $C_0$, $C_1$ and $C_2$ are all constants ranging from 0 to 255, $Y_0$ and $Y_1$ are constants of brightness difference, which are both constants ranging from 0 to 255. Because a grayscale image has grayscale values ranging from 0 to 255, an ideal binarization effect may be obtained with $Y_0=110$ and $Y_1=130$. Thus, preferably, the constants of brightness difference are $Y_0=110$ and $Y_1=130$. $C_0$, $C_1$ and $C_2$ range from 0 to 255 and are ascending in sequence. An ideal binarization effect may be obtained with $C_0=4$, $C_1=14$ and $C_2=24$. Thereby, in the equation of the contrast factor C, preferably, $C_0=4$, $C_1=14$ and $C_2=24$.

In this embodiment, preferably, in the grayscale threshold obtaining unit, the predetermined area is set to comprise n×n block regions, wherein the n is an integer larger than 1, preferably, n=5.

With the method of decoding two dimensional code provided in this embodiment, in the binarization process of a two dimensional code image, the two dimensional code image may be recovered clearly and accurately, and target objects in the two dimensional code image may be separated from the background in a better manner to overcome problems of dim or non-uniform illumination.

In the system for decoding two dimensional code, the decoding module comprises:

a coordinate determination unit, for determining an initial coordination system and a correction coordination system in which a corrected image locates, wherein each point in the correction coordination system corresponds to a point in the initial coordinate system; and comprising:

a detection pattern coordinate obtaining subunit for determining coordinates of central points of detection patterns in the initial coordinate system, a correction pattern coordinate obtaining subunit for determining coordinates of the central points of the correction pattern in the initial coordinate system;

a correction coordinates obtaining subunit for determining the coordinates of the central points of the detection patterns and the correction patterns in the correction coordinate system;

a correction pattern obtaining unit for correcting the binary image according to the coordinates of the central points of each detection pattern and the correction pattern in the initial coordinate system and the correction coordinate system to obtain a corrected pattern;

an information obtaining unit for obtaining information contained in the corrected pattern.

preferably, the detection pattern coordinate obtaining subunit is configured to detect the binary image along a first direction to detect a first line segment having a length ratio of black:white:black:white:black meeting a first predetermined ratio, and determining the central point of the first line segment; and detect along a second direction a line running through the central point of the first line segment to get a second line segment having a length ratio of black:white:black:white:black meeting the first predetermined ratio, and using the central point of the second line segment as the central point of the detection pattern.

Further, preferably, the detection pattern coordinate obtaining subunit is further configured to set a detection step size for detecting the binary image along the first direction, wherein the detection step size is less than or equal to the number of pixels in one module of the binary image in the first direction.

Further, preferably, the detection pattern coordinate obtaining subunit is further configured to obtain the detection step size according to the number of pixels in the binary image in the first direction and the number of pixels in the one module in the first direction.

Wherein, the detection pattern coordinate obtaining subunit obtains the detection step through the following equation:

$L = \mathrm{Max}(M \times N/\mathrm{Mod}, \mathrm{Min})$ wherein, M is the number of pixels contained in the binary image in the first direction, N is an adjustment coefficient and $0 < N \le 1$, Mod is the preset number of modules contained in the binary image in the first direction, Min is the number of pixels contained in one module of the binary image in the first direction, preferably, Mod=57.

In this embodiment, the correction pattern coordinate obtaining subunit is configured to obtain reference coordinates based on the relative location relationship between the central point of the correction pattern and the central points of the detection patterns, and locate the correction pattern precisely in a predetermined area with respect to the reference coordinates to obtain coordinates of the central point of the correction pattern.

In this embodiment, the correction pattern coordinate obtaining subunit is further configured to obtain a horizontal reference coordinate according to the horizontal distance between the central point of the correction pattern and the central point of the first detection pattern; and obtain a vertical reference coordinate according to the vertical distance between the central point of the correction pattern and the central point of the first detection pattern, wherein the horizontal distance and the vertical distance are determined according to the following equations:

the horizontal distance is $\epsilon_h = \epsilon(X_R - X_A)$ the vertical distance is $\epsilon_z = \epsilon(Y_R - Y_A)$ wherein, $X_R = X_B - X_A + X_C$, $Y_R = Y_B - Y_A + Y_C$, $(X_B, Y_B)$ is the coordinates of the central point of the second detection pattern; $(X_C, Y_C)$ is the coordinates of the central point of the third detection pattern; $\epsilon$ is an offset factor of the correction pattern, and $\epsilon = (N-3)/K$, K is the number of modules contained in the binary image in the first direction.

Preferably, in the correction pattern coordinate obtaining subunit, the predetermined area is set as a square region including the reference coordinates, wherein the square region includes at least 64 modules, preferably, 256 or 1024 modules.

further, the correction pattern coordinate obtaining subunit is further configured to detect, in the predetermined area along the first direction, a third line segment having a length ratio of white:black:white meeting a second predetermined ratio, and determine the central point of the black portion of the third line segment; and take the central point of the black portion of the third line segment as a reference to obtain a line perpendicular to the third line segment, detecting along the line a fourth line segment having a length ration of white:black:white meeting the second predetermined ratio, and taking the central point of the black portion of the fourth line segment as the central point of the correction pattern. For the second predetermined ratio, the sum of lengths of the white sections and the black section is from 0.7L to 1.3L, wherein L is the length of three modules, and the lengths of the white section and the black section are both less than or equal to the length of 2 modules.

Further, the correction pattern obtaining unit comprises:

a conversion coefficient obtaining subunit for obtaining conversion coefficients according to coordinates of the central point of each detection pattern and coordinates of the central point of the correction pattern in the initial coordinate system and the correction coordinate system;

a correction subunit for according to the conversion coefficients, for each point in the correction coordinate system, finding out a module of the binary image in which its corresponding point in the initial coordinate system locates, and assigning the grayscale value of that module to the point to realize correction of the binary image.

In the correction subunit, the grayscale value of the central pixel of the module is set as the grayscale value of the module.

In the correction subunit of this embodiment, the conversion coefficients are obtained following a rule of perspective transformation.

The two dimensional code image correction method of this embodiment does not need edge detection, and may obtain conversion coefficients directly using three detection patterns and a correction pattern. Drawbacks caused by edge detection algorithms may be avoided, and favourable correction effect may be obtained.

A person skilled in the art should appreciate that the examples of the present application may be provided as method, system, or a computer program product. Therefore, the present application may take the form of completely hardware examples, completely software examples, or hardware and software combined examples. Moreover, the present application may adopt the form of a computer program product implemented on one or more computer readable storage medium (including but not limited to a disk storage, a CD-ROM, an optical disk, etc) containing computer usable program codes.

The present application is described with reference to the flowcharts and/or block diagrams of the method, apparatus (system) and computer program product of the examples of the present invention. It should be understood that a computer program instruction is used to implement each flow and/or block in the flowcharts and/or block diagrams, and combination of flows/blocks in the flowcharts and/or block diagrams. These computer program instructions may be provided to a universal computer, a special computer, an embedded processor or processors of other programmable data processing devices to generate a machine such that an apparatus for implementing the functions specified in one or more flow in the flowcharts and/or one or more blocks in the block diagrams is generated through the instructions executed by the computer or the processor of other programmable data processing devices.

These computer program instructions may also be stored in a computer readable memory that can direct the computer or other programmable data processing devices to work in a particular manner such that the instruction stored in the computer readable memory generates a product including an instruction apparatus, which implements the functions specified in one or more flows in the flowchart and/or one or more blocks in the block diagram.

These computer program instructions may also be loaded in a computer or other programmable data processing devices such that a series of operation steps are executed on the computer or other programmable data processing devices to generate computer implemented processing, and thus the instruction executed on the computer or other programmable data processing devices provides the steps for implementing the functions specified in one or more flows in the flowchart and/or one or more blocks in the block diagram.

Figure 13:
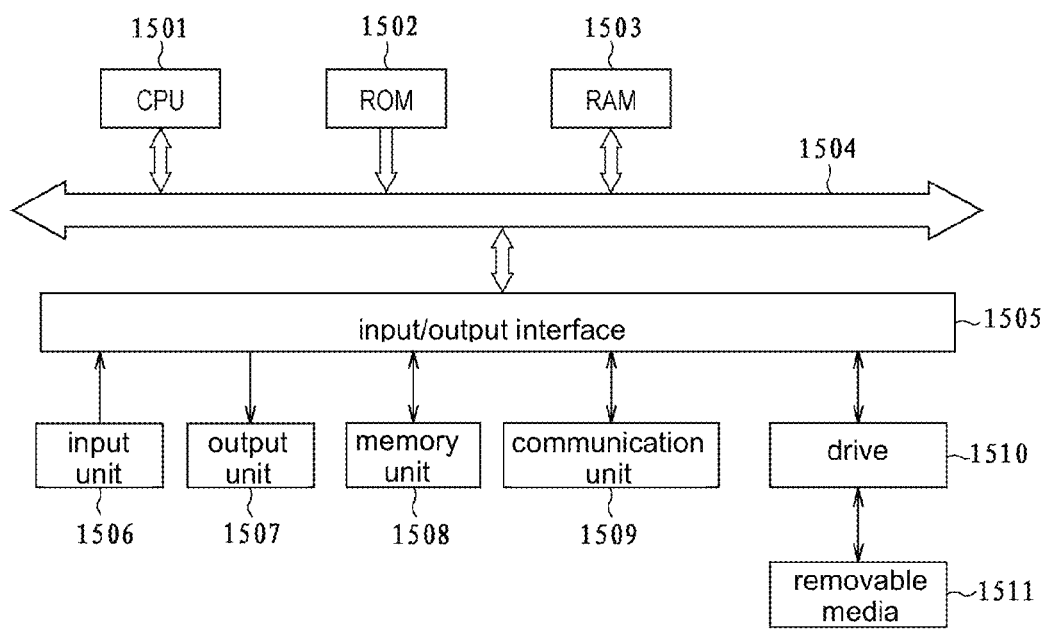
FIG. 13 shows a block diagram of an example of the structure of a computer.

FIG. 13 shows a block diagram of an exemplary computer hardware structure for carrying out the above processes.

A central processing unit (CPU) 1501, read-only memory (ROM) 1502 and random access memory (RAM) 1503 are connected with each other through a bus 1504.

An input/output (I/O) interface 1505 is connected to the bus 1504. Input units 1506 such as a keyboard or mouse and output units 1507 such as a display or a speaker are connected to the I/O interface 1505. In addition, a memory unit 1508 such as a hard disk or non-volatile memory, a communication unit 1509 such as a network interface and a driver 1510 for driving removable media 1511 are connected to the I/O interface 1505.

In the computer configuration described above, the CPU 1501 loads programs stored in the memory unit 1508 to RAM 1503 through the I/O interface 1505 and the bus 1504, and executes the programs to perform the above processes.

The programs executed by the CPU 1501 may be, for example, recorded on the removable media 1511 or may be provided through wired or wireless transmission media (e.g. a LAN, the Internet, or digital broadcasting), and installed in the memory unit 1508.

The programs executed by the computer may be executed according to the order described above, or may be processed whenever necessary (for example, by all).

Although the preferred examples of the present application have been described, a person skilled in the art, once obtaining the basic inventive concept, can make additional variations and modifications to these examples. Therefore, the attached claims are intended to be interpreted as including the preferred examples and all variations and modifications falling into the scope of the present application.

What is claimed is:

1. A method for decoding a two dimensional code, the method comprising:
performing a binarization process on a two dimensional code image to obtain a binary image, the binarization process comprising:
dividing the two dimensional code image into a plurality of block regions;
obtaining grayscale values of all pixels in each block region, and obtaining a grayscale value for each block region according to the grayscale values of all the pixels;
determining, a grayscale threshold for each block region according to an average grayscale value of a predetermined area where the block region locates;
binarizing pixels in the block region to obtain a binary image, according to a grayscale threshold corresponding to each block region;
decoding the binary image to obtain information content contained in the two dimensional code;
wherein the binarization process further comprises:
constructing a contrast factor according to the relationship between grayscale values of pixels in the two dimensional code image, wherein the contrast factor is proportional to the difference between a maximum grayscale value and a minimum grayscale value of the two dimensional code image;
the step of obtaining grayscale values of all pixels in each block region, and obtaining a grayscale value for each block region according to the grayscale values of all the pixels comprises:
determining a grayscale value for a block region, according to the relationship between the contrast factor and the difference between a maximum grayscale value and a minimum grayscale value in the block region, in conjunction with grayscale values of other block regions adjacent to the block region;
wherein determining a grayscale value for a block region according to the relationship between the contrast factor and the difference between a maximum grayscale value and a minimum grayscale value in the block region, in conjunction with grayscale values of other block regions adjacent to the block region, a grayscale value $\overline{y_{ij}}$ is obtained for a block region (i,j) according to the following equation:

$$\overline{y_{ij}} = \begin{cases} \dfrac{S_{ij}}{m^2} & \max_{ij} - \min_{ij} > C \\ bg & \max_{ij} - \min_{ij} <= C \,\&\&\, \min_{ij} < \left(bg = \dfrac{\overline{y_{i-1j-1}} + \overline{y_{ij-1}} * 2 + \overline{y_{i-1j}}}{4}\right) \\ \dfrac{\min_{ij}}{2} & \max_{ij} - \min_{ij} <= C \,\&\&\, \min_{ij} >= \left(bg = \dfrac{\overline{y_{i-1j-1}} + \overline{y_{ij-1}} * 2 + \overline{y_{i-1j}}}{4}\right) \end{cases}$$

wherein, i represents the number of a row the block region locates, j represents the number of a column the block region locates, $S_{ij}$ represents the sum of grayscale values of all pixels in the block region, C represents the contrast factor, $\max_{ij}$ represents the maximum grayscale value in the block region, $\min_{ij}$ represents the minimum grayscale value in the block region, m represents that the block region includes m×m pixels, wherein m is an integer larger than 1.

2. The method of claim 1 wherein the contrast factor C is constructed according to the following equation:

$$C = \begin{cases} C_0 & Y_{max} - Y_{min} < Y_0 \\ C_1 & Y_0 < Y_{max} - Y_{min} < Y_1 \\ C_2 & Y_{max} - Y_{min} > Y_1 \end{cases}$$

wherein, $C_0$, $C_1$ and $C_2$ are all constants ranging from 0 to 255, $Y_0$ and $Y_1$ are constants of brightness difference, which are both constants ranging from 0 to 255.

3. The method of claim 1 wherein determining, a grayscale threshold for each block region according to an average grayscale value of a predetermined area where the block region locates:
the predetermined area comprises n×n block regions, wherein n is an integer larger than 1.

4. The method of claim 1 wherein decoding the binary image to obtain information content contained in the two dimensional code comprises:
determining an initial coordination system and a correction coordination system in which a corrected image locates, wherein each point in the correction coordination system corresponds to a point in the initial coordination system; and determining coordinates of central points of detection patterns and a corrected pattern in the initial coordinate system and the correction coordinate system respectively, wherein the detection patterns comprise a first detection pattern, a second detection pattern, and a third detection pattern;
correcting the binary image according to the coordinates of the central points of each detection pattern and the correction pattern in the initial coordinate system and the correction coordinate system to obtain a corrected pattern;
obtaining information contained in the corrected pattern.

5. The method of claim 4 wherein determining coordinates of central points of the detection patterns, the step of determining a central point of each detection pattern comprises:
detecting the binary image along a first direction to detect a first line segment having a length ratio of black:white:black:white:black meeting a first predetermined ratio, and determining the central point of the first line segment;
detecting along a second direction a line running through the central point of the first line segment to get a second line segment having a length ratio of black:white:black:white:black meeting the first predetermined ratio, and using the central point of the second line segment as the central point of the detection pattern.

6. The method of claim 5 wherein determining coordinates of the central point of each detection pattern further comprises:
setting a detection step size for detecting the binary image along the first direction, wherein the detection step size is less than or equal to the number of pixels in one module of the binary image in the first direction.

7. The method of claim 6 wherein setting a detection step size for detecting the binary image along the first direction, the detection step size is obtained according to the number of pixels in the binary image in the first direction and the number of pixels in the one module in the first direction.

8. The method of claim 6 wherein setting a detection step size for detecting the binary image along the first direction, the detection step size is obtained through the following equation:

$$L=\text{Max}(M\times N/\text{Mod},\text{Min})$$

wherein, M is the number of pixels contained in the binary image in the first direction, N is an adjustment coefficient and $0<N\leq 1$, Mod is the preset number of modules contained in the binary image in the first direction, Min is the number of pixels contained in one module of the binary image in the first direction.

9. The method of claim 4 wherein determining coordinates of the central point of the correction pattern in the initial coordinate system comprises:
   obtaining reference coordinates based on the relative location relationship between the central point of the correction pattern and the central points of the detection patterns;
   locating the correction pattern precisely in a predetermined area with respect to the reference coordinates to obtain coordinates of the central point of the correction pattern.

10. The method of claim 9 wherein obtaining reference coordinates based on the relative location relationship between the central point of the correction pattern and the central points of the detection pattern comprises:
   obtaining a horizontal reference coordinate according to the horizontal distance between the central point of the correction pattern and the central point of the first detection pattern; obtaining a vertical reference coordinate according to the vertical distance between the central point of the correction pattern and the central point of the first detection pattern, wherein the horizontal distance and the vertical distance are determined according to the following equations:

the horizontal distance is $\epsilon_h=\epsilon(X_R-X_A)$ the vertical distance is $\epsilon_z=\epsilon(Y_R-Y_A)$ wherein, $X_R=X_B-X_A+X_C$, $Y_R=Y_B-Y_A+Y_C$, $(X_B,Y_B)$ is the coordinates of the central point of the second detection pattern; $(X_C,Y_C)$ is the coordinates of the central point of the third detection pattern; $\epsilon$ is an offset factor of the correction pattern, and $\epsilon=(N-3)/K$, K is the number of modules contained in the binary image in the first direction.

11. The method of claim 9 wherein locating the correction pattern precisely in a predetermined area with respect to the reference coordinates to obtain coordinates of the central point of the correction pattern:
   the predetermined area is a square region including the reference coordinates, wherein the square region includes at least 64 modules.

12. The method of claim 9 wherein locating the correction pattern precisely in a predetermined area with respect to the reference coordinates to obtain coordinates of the central point of the correction pattern comprises:
   detecting, in the predetermined area along the first direction, a third line segment having a length ratio of white:black:white meeting a second predetermined ratio, and determining the central point of the black portion of the third line segment;
   taking the central point of the black portion of the third line segment as a reference to obtain a line perpendicular to the third line segment, detecting along the line a fourth line segment having a length ration of white:black:white meeting the second predetermined ratio, and taking the central point of the black portion of the fourth line segment as the central point of the correction pattern.

13. The method of claim 4 wherein correcting the binary image according to the coordinates of the central point of each detection pattern and the correction pattern in the initial coordinate system and the correction coordinate system to obtain a corrected pattern comprises:
   obtaining conversion coefficients according to coordinates of the central point of each detection pattern and coordinates of the central point of the correction pattern in the initial coordinate system and the correction coordinate system;
   according to the conversion coefficients, for each point in the correction coordinate system, finding out a module of the binary image in which its corresponding point in the initial coordinate system locates, and assigning the grayscale value of that module to the point to realize correction of the binary image.

14. The method of claim 13 wherein according to the conversion coefficients, for each point in the correction coordinate system, finding out a module of the binary image in which its corresponding point in the initial coordinate system locates, and assigning the grayscale value of that module to the point to realize correction of the binary image,
   the grayscale value of the module is the grayscale value of the central pixel of the module.

15. The method of claim 13 wherein obtaining conversion coefficients according to coordinates of the central point of each detection pattern and coordinates of the central point of the correction pattern in the initial coordinate system and the correction coordinate system,
   the conversion coefficients are obtained following a rule of perspective transformation.

16. A system for decoding a two dimensional code, the system comprising:
   a binarization module for performing a binarization process on a two dimensional code image to obtain a binary image, further comprising:
      a dividing unit for dividing the two dimensional code image into a plurality of block regions;
      a grayscale value obtaining unit for obtaining grayscale values of all pixels in each block region, and obtaining a grayscale value for each block region according to the grayscale values of all the pixels;
      a grayscale threshold obtaining unit for determining, a grayscale threshold for each block region according to an average grayscale value of a predetermined area where the block region locates;
      a binary image obtaining unit for binarizing pixels in the block region to obtain a binary image, according to a grayscale threshold corresponding to each block region;
   a decoding module for decoding the binary image to obtain information content contained in the two dimensional code;
   wherein the binarization module further comprises:
      a contrast factor construction module for constructing a contrast factor according to the relationship between grayscale values of pixels in the two dimensional code image, wherein the contrast factor is proportional to the difference between a maximum grayscale value and a minimum grayscale value of the two dimensional code image;
      wherein the grayscale value obtaining unit is further configured to determine a grayscale value for a block region, according to the relationship between the contrast factor and the difference between a maximum grayscale value and a minimum grayscale value in the block region, in conjunction with grayscale values of other block regions adjacent to the block region;
wherein the contrast factor construction module obtains a grayscale value $\overline{y_{ij}}$ for a block region (i,j) in according to the following equation:

$$\overline{y_{ij}} = \begin{cases} \frac{S_{ij}}{m^2} & \max_{ij} - \min_{ij} > C \\ bg & \max_{ij} - \min_{ij} <= C \ \&\& \ \min_{ij} < \left(bg = \frac{\overline{y_{i-1j-1}} + \overline{y_{ij-1}} * 2 + \overline{y_{i-1j}}}{4}\right) \\ \frac{\min_{ij}}{2} & \max_{ij} - \min_{ij} <= C \ \&\& \ \min_{ij} >= \left(bg = \frac{\overline{y_{i-1j-1}} + \overline{y_{ij-1}} * 2 + \overline{y_{i-1j}}}{4}\right) \end{cases}$$

wherein, i represents the number of a row the block region locates, j represents the number of a column the block region locates, $S_{ij}$ represents the sum of grayscale values of all pixels in the block region, C represents the contrast factor, $\max_{ij}$ represents the maximum grayscale value in the block region, $\min_{ij}$ represents the minimum grayscale value in the block region, m represents that the block region includes $m \times m$ pixels, wherein m is an integer larger than 1.

17. The system of claim 16 wherein the contrast factor C is constructed in the contrast factor construction module according to the following equation:

$$C = \begin{cases} C_0 & Y_{max} - Y_{min} < Y_0 \\ C_1 & Y_0 < Y_{max} - Y_{min} < Y_1 \\ C_2 & Y_{max} - Y_{min} > Y_1 \end{cases}$$

wherein, $C_0$, $C_1$ and $C_2$ are all constants ranging from 0 to 255, $Y_0$ and $Y_i$ are constants of brightness difference, which are both constants ranging from 0 to 255.

18. The system of claim 16 wherein in the grayscale threshold obtaining unit, the predetermined area is set to comprise n×n block regions, wherein the n is an integer larger than 1.

19. The system of claim 16 wherein the decoding module comprises:
a coordinate determination unit, for determining an initial coordination system and a correction coordination system in which a corrected image locates, wherein each point in the correction coordination system corresponds to a point in the initial coordination system; and comprising:
a detection pattern coordinate obtaining subunit for determining coordinates of central points of detection patterns in the initial coordinate system,
a correction pattern coordinate obtaining subunit for determining coordinates of the central points of the correction pattern in the initial coordinate system;
a correction coordinates obtaining subunit for determining the coordinates of the central points of the detection patterns and the correction patterns in the correction coordinate system;
a correction pattern obtaining unit for correcting the binary image according to the coordinates of the central points of each detection pattern and the correction pattern in the initial coordinate system and the correction coordinate system to obtain a corrected pattern;
an information obtaining unit for obtaining information contained in the corrected pattern.

20. The system of claim 19 wherein the detection pattern coordinate obtaining subunit is configured to detect the binary image along a first direction to detect a first line segment having a length ratio of black:white:black:white:black meeting a first predetermined ratio, and determining the central point of the first line segment; and detect along a second direction a line running through the central point of the first line segment to get a second line segment having a length ratio of black:white:black:white:black meeting the first predetermined ratio, and using the central point of the second line segment as the central point of the detection pattern.

21. The system of claim 20 wherein the detection pattern coordinate obtaining subunit is further configured to set a detection step size for detecting the binary image along the first direction, wherein the detection step size is less than or equal to the number of pixels in one module of the binary image in the first direction.

22. The system of claim 21 wherein the detection pattern coordinate obtaining subunit is further configured to obtain the detection step size according to the number of pixels in the binary image in the first direction and the number of pixels in the one module in the first direction.

23. The system of claim 21 wherein the detection pattern coordinate obtaining subunit obtains the detection step through the following equation:

$$L = \text{Max}(M \times N/\text{Mod}, \text{Min})$$

wherein, M is the number of pixels contained in the binary image in the first direction, N is an adjustment coefficient and 0<N≤1, Mod is the preset number of modules contained in the binary image in the first direction, Min is the number of pixels contained in one module of the binary image in the first direction.

24. The system of claim 19 wherein the correction pattern coordinate obtaining subunit is configured to obtain reference coordinates based on the relative location relationship between the central point of the correction pattern and the central points of the detection patterns, and locate the correction pattern precisely in a predetermined area with respect to the reference coordinates to obtain coordinates of the central point of the correction pattern.

25. The system of claim 24 wherein the correction pattern coordinate obtaining subunit is further configured to obtain a horizontal reference coordinate according to the horizontal distance between the central point of the correction pattern and the central point of the first detection pattern; and obtain a vertical reference coordinate according to the vertical distance between the central point of the correction pattern and the central point of the first detection pattern, wherein the horizontal distance and the vertical distance are determined according to the following equations:

the horizontal distance is $\epsilon_h = \epsilon(X_R - X_A)$ the vertical distance is $\epsilon_z = \epsilon(Y_R - Y_A)$ wherein, $X_R = X_B - X_A + X_C$, $Y_R = Y_B - Y_A + Y_C$, $(X_B, Y_B)$ is the coordinates of the central point of the second detection pattern; $(X_C, Y_C)$ is the coordinates of the central point of the third detection pattern; $\epsilon$ is an offset factor of the correction pattern, and $\epsilon = (N-3)/K$, K is the number of modules contained in the binary image in the first direction.

26. The system of claim 24 wherein in the correction pattern coordinate obtaining subunit, the predetermined area is set as a square region including the reference coordinates, wherein the square region includes at least 64 modules.

27. The system of claim 24 wherein the correction pattern coordinate obtaining subunit is further configured to detect, in the predetermined area along the first direction, a third line segment having a length ratio of white:black:white meeting a second predetermined ratio, and determine the central point of the black portion of the third line segment; and take the central point of the black portion of the third line segment as a reference to obtain a line perpendicular to the third line segment, detecting along the line a fourth line segment having a length ration of white:black:white meeting the second predetermined ratio, and taking the central point of the black portion of the fourth line segment as the central point of the correction pattern.

28. The system of claim 19 wherein the correction pattern obtaining unit comprises:
    a conversion coefficient obtaining subunit for obtaining conversion coefficients according to coordinates of the central point of each detection pattern and coordinates of the central point of the correction pattern in the initial coordinate system and the correction coordinate system;
    a correction subunit for according to the conversion coefficients, for each point in the correction coordinate system, finding out a module of the binary image in which its corresponding point in the initial coordinate system locates, and assigning the grayscale value of that module to the point to realize correction of the binary image.

29. The system of claim 28 wherein the correction subunit, the grayscale value of the central pixel of the module is set as the grayscale value of the module.

30. The system of claim 28 wherein in the correction subunit, the conversion coefficients are obtained following a rule of perspective transformation.

31. A system for decoding two dimensional code, the system comprising;
    a processor, the processor is configured to performing a binarization process on a two dimensional code image to obtain a binary image, the binarization process comprising:
        dividing the two dimensional code image into a plurality of block regions;
        obtaining grayscale values of all pixels in each block region, and obtaining a grayscale value for each block region according to the grayscale values of all the pixels;
        determining, a grayscale threshold for each block region according to an average grayscale value of a predetermined area where the block region locates;
        binarizing pixels in the block region to obtain a binary image, according to a grayscale threshold corresponding to each block region;
        decoding the binary image to obtain information content contained in the two dimensional code;
    wherein the binarization module further comprises:
        a contrast factor construction module for constructing a contrast factor according to the relationship between grayscale values of pixels in the two dimensional code image, wherein the contrast factor is proportional to the difference between a maximum grayscale value and a minimum grayscale value of the two dimensional code image;
    wherein the grayscale value obtaining is further configured to determine a grayscale value for a block region, according to the relationship between the contrast factor and the difference between a maximum grayscale value and a minimum grayscale value in the block region, in conjunction with grayscale values of other block regions adjacent to the block region;
    wherein the contrast factor construction module obtains a grayscale value $\overline{y}_{ij}$ for a block region (i,j) in according to the following equation:

$$\overline{y}_{ij} = \begin{cases} \dfrac{S_{ij}}{m^2} & \max_{ij} - \min_{ij} > C \\ bg & \max_{ij} - \min_{ij} <= C \,\&\&\, \min_{ij} < \left(bg = \dfrac{\overline{y}_{i-1j-1} + \overline{y}_{ij-1}*2 + \overline{y}_{i-1j}}{4}\right) \\ \dfrac{\min_{ij}}{2} & \max_{ij} - \min_{ij} <= C \,\&\&\, \min_{ij} >= \left(bg = \dfrac{\overline{y}_{i-1j-1} + \overline{y}_{ij-1}*2 + \overline{y}_{i-1j}}{4}\right) \end{cases}$$

wherein, i represents the number of a row the block region locates, j represents the number of a column the block region locates, $S_{ij}$ represents the sum of grayscale values of all pixels in the block region, C represents the contrast factor, $\max_{ij}$ represents the maximum grayscale value in the block region, $\min_{ij}$ represents the minimum grayscale value in the block region, m represents that the block region includes m*m pixels, wherein m is an integer larger than 1.

* * * * *